US010452169B2

(12) United States Patent
Wang et al.

(10) Patent No.: US 10,452,169 B2
(45) Date of Patent: *Oct. 22, 2019

(54) STIFFNESS RENDERING FOR A PENCIL

(71) Applicant: Apple Inc., Cupertino, CA (US)

(72) Inventors: Paul X. Wang, Cupertino, CA (US); Alex J. Lehmann, Sunnyvale, CA (US); Joel N. Ruscher, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,839

(22) Filed: Mar. 4, 2019

(65) Prior Publication Data
US 2019/0196607 A1 Jun. 27, 2019

Related U.S. Application Data

(63) Continuation of application No. 15/592,029, filed on May 10, 2017, now Pat. No. 10,268,288.
(Continued)

(51) Int. Cl.
G06F 3/01 (2006.01)
G06F 3/0346 (2013.01)
(Continued)

(52) U.S. Cl.
CPC ............ G06F 3/0383 (2013.01); G06F 3/016 (2013.01); G06F 3/0346 (2013.01); G06F 3/03545 (2013.01); G06F 3/0414 (2013.01)

(58) Field of Classification Search
CPC .... G06F 3/016; G06F 3/0346; G06F 3/03545; G06F 3/0383; G06F 3/0414
See application file for complete search history.

(56) References Cited

U.S. PATENT DOCUMENTS 5,491,904 A 2/1996 McMurtry
5,942,733 A 8/1999 Allen et al.
(Continued)

FOREIGN PATENT DOCUMENTS

KR 100286611 B1 1/2001

OTHER PUBLICATIONS

Wang et al., "Electroactive polymers for sensing," Interface Focus 6: 20160026, The Royal Society Publishing, Jun. 2016, 20 pages.
(Continued)

Primary Examiner — Ryan A Lubit
(74) Attorney, Agent, or Firm — Dickinson Wright RLLP

(57) ABSTRACT

According to some embodiments, an accessory device for use with a touch sensitive portion of an electronic device is described. The accessory device can include a housing having walls that carry operational components, where the operational components include a processor coupled to a feedback component arranged to provide feedback and a distal tip coupled to the feedback component. The distal tip is capable of engaging with and transmitting a load applied to the housing to an external surface of the touch sensitive portion. The processor can be further coupled to a sensor in communication with the distal tip, the sensor being capable of (i) detecting a physical change when the distal tip engages with the external surface, and (ii) responding to the physical change by providing a detection signal to the processor, that, in response, instructs the feedback component to provide the feedback to the distal tip.

20 Claims, 27 Drawing Sheets

Related U.S. Application Data

(60) Provisional application No. 62/397,243, filed on Sep. 20, 2016.

(51) Int. Cl.
*G06F 3/0354* (2013.01)
*G06F 3/038* (2013.01)
*G06F 3/041* (2006.01)

(56) References Cited

U.S. PATENT DOCUMENTS

| | | |
|---|---|---|
| 6,353,414 B1 | 3/2002 | Jones et al. |
| 6,809,462 B2 | 10/2004 | Pelrine et al. |
| 6,894,683 B2 | 5/2005 | Clapper et al. |
| 7,424,154 B2 | 9/2008 | Seto et al. |
| 9,239,622 B2 | 1/2016 | Park et al. |
| 9,329,703 B2 | 5/2016 | Falkenburg et al. |
| 10,268,273 B1 | 4/2019 | Sundaram et al. |
| 10,268,288 B1 | 4/2019 | Wang et al. |
| 2005/0248549 A1 | 11/2005 | Dietz et al. |
| 2006/0001654 A1* | 1/2006 | Smits .............. G06F 3/03542 345/176 |
| 2008/0055279 A1 | 3/2008 | Osada et al. |
| 2008/0238879 A1 | 10/2008 | Jaeger et al. |
| 2009/0022332 A1 | 1/2009 | Van Schaack et al. |
| 2009/0122024 A1 | 5/2009 | Nakamura et al. |
| 2010/0171718 A1 | 7/2010 | Denda |
| 2011/0115751 A1* | 5/2011 | Wernersson .............. G06F 3/016 345/179 |
| 2011/0304577 A1 | 12/2011 | Brown et al. |
| 2011/0320204 A1 | 12/2011 | Locker et al. |
| 2012/0127088 A1 | 5/2012 | Pance et al. |
| 2012/0327040 A1 | 12/2012 | Simon et al. |
| 2013/0002580 A1 | 1/2013 | Sudou |
| 2013/0106715 A1 | 5/2013 | Shahparnia et al. |
| 2013/0106794 A1 | 5/2013 | Logan et al. |
| 2013/0194242 A1 | 8/2013 | Park et al. |
| 2013/0234967 A1 | 9/2013 | Stoddard |
| 2013/0234986 A1 | 9/2013 | Elias |
| 2013/0265218 A1 | 10/2013 | Moscarillo |
| 2013/0307829 A1* | 11/2013 | Libin .............. G06F 3/016 345/179 |
| 2014/0028592 A1* | 1/2014 | Wang .............. G06F 3/03545 345/173 |
| 2014/0043289 A1 | 2/2014 | Stern |
| 2014/0062966 A1 | 3/2014 | Szymanski et al. |
| 2014/0078070 A1* | 3/2014 | Armstrong-Muntner .............. G06F 3/044 345/173 |
| 2014/0078117 A1* | 3/2014 | Asano .............. G09B 11/00 345/179 |
| 2014/0168124 A1 | 6/2014 | Park et al. |
| 2014/0198069 A1 | 7/2014 | Park et al. |
| 2014/0210756 A1 | 7/2014 | Lee et al. |
| 2014/0285453 A1 | 9/2014 | Park et al. |
| 2014/0340318 A1* | 11/2014 | Stringer .............. G06F 3/03545 345/173 |
| 2015/0029136 A1 | 1/2015 | Shahparnia |
| 2015/0169056 A1 | 6/2015 | Weddle et al. |
| 2015/0177838 A1 | 6/2015 | Bae et al. |
| 2015/0241970 A1 | 8/2015 | Park et al. |
| 2015/0261382 A1 | 9/2015 | Lin et al. |
| 2015/0338993 A1 | 11/2015 | Kuo et al. |
| 2016/0018891 A1 | 1/2016 | Levesque et al. |
| 2016/0035964 A1 | 2/2016 | Storm et al. |
| 2016/0044422 A1 | 2/2016 | Aurongzeb et al. |
| 2016/0048225 A1 | 2/2016 | Curtis |
| 2016/0054820 A1 | 2/2016 | Sezgin et al. |
| 2016/0109972 A1 | 4/2016 | Hyde |
| 2016/0188205 A1 | 6/2016 | Rao et al. |
| 2016/0209957 A1 | 7/2016 | Jung et al. |
| 2016/0231833 A1* | 8/2016 | Gu .............. G06F 3/03545 |
| 2016/0282970 A1 | 9/2016 | Evreinov et al. |
| 2016/0306426 A1 | 10/2016 | Modarres et al. |
| 2017/0176171 A1 | 6/2017 | Harsila et al. |
| 2017/0177136 A1 | 6/2017 | Chandran et al. |
| 2017/0262086 A1 | 9/2017 | Ogata et al. |
| 2017/0285774 A1 | 10/2017 | Parikh et al. |
| 2018/0046249 A1* | 2/2018 | Peretz .............. G06F 3/03545 |
| 2018/0188830 A1* | 7/2018 | Kim .............. G06F 3/03545 |
| 2018/0329529 A1 | 11/2018 | Stringer |

OTHER PUBLICATIONS

Ozsecen et al., "Nonlinear Force Control of Dielectric Electroactive Polymer Actuators," Electroactive Polymer Actuators and Devices (EAPAD), Proc. of SPIE, vol. 7642, Mar. 2010, pp. 76422C-1-76422C-8, 8 pages.

El-Sayed et al., "Development of a Micro-Gripper Using Piezoelectric Bimorphs," MDPI, Sensors 13, No. 5, May 7, 2013, pp. 5826-5840, 15 pages.

"Haptics—Solutions for ERM and LRA Actuators," Texas Instruments, 2013, 5 pages.

* cited by examiner

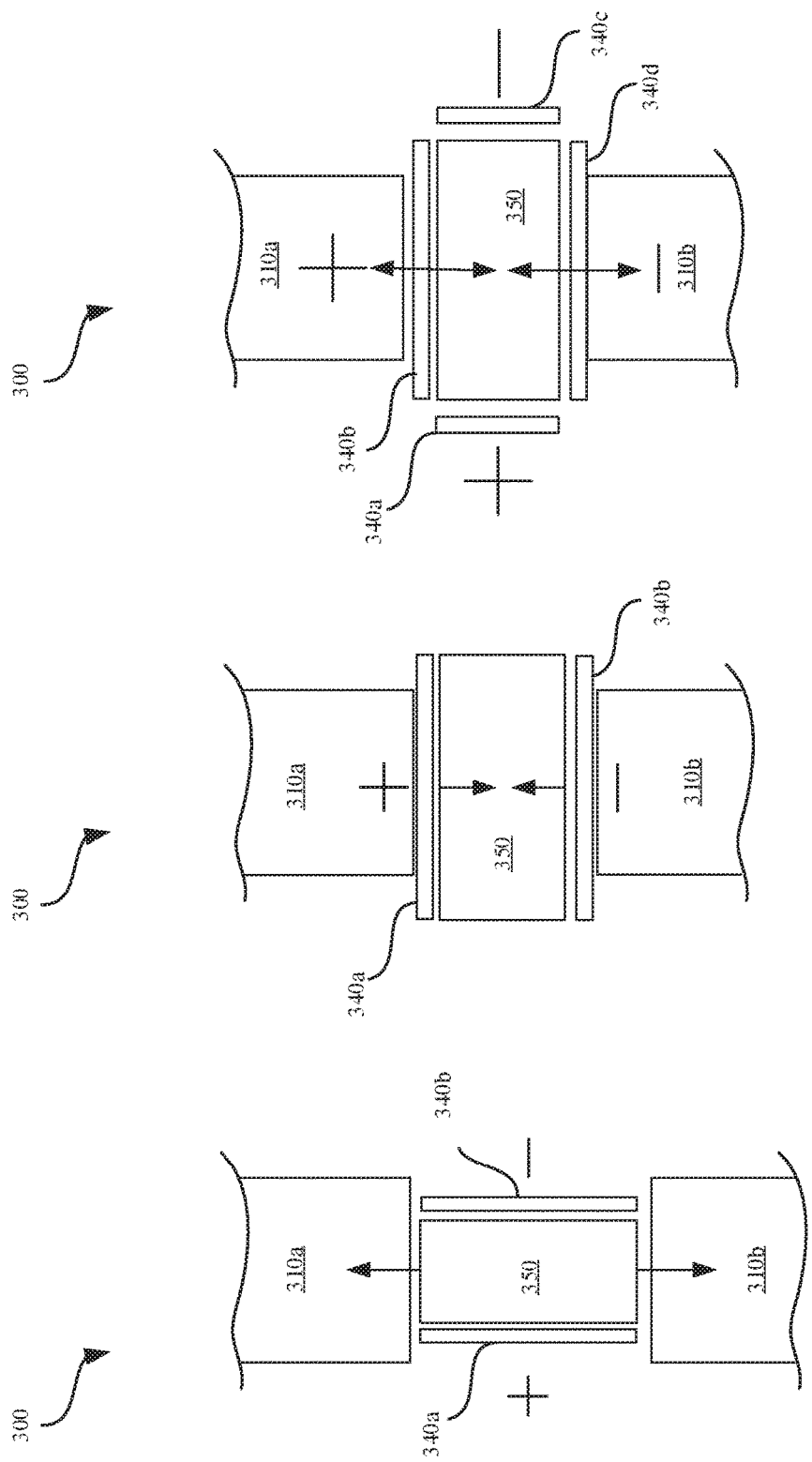

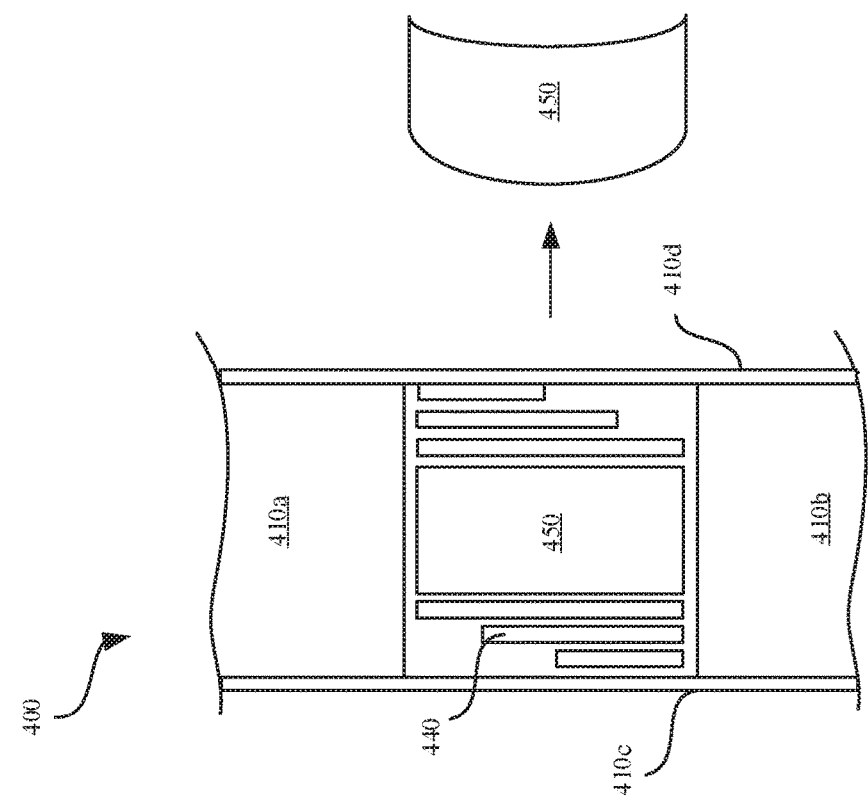
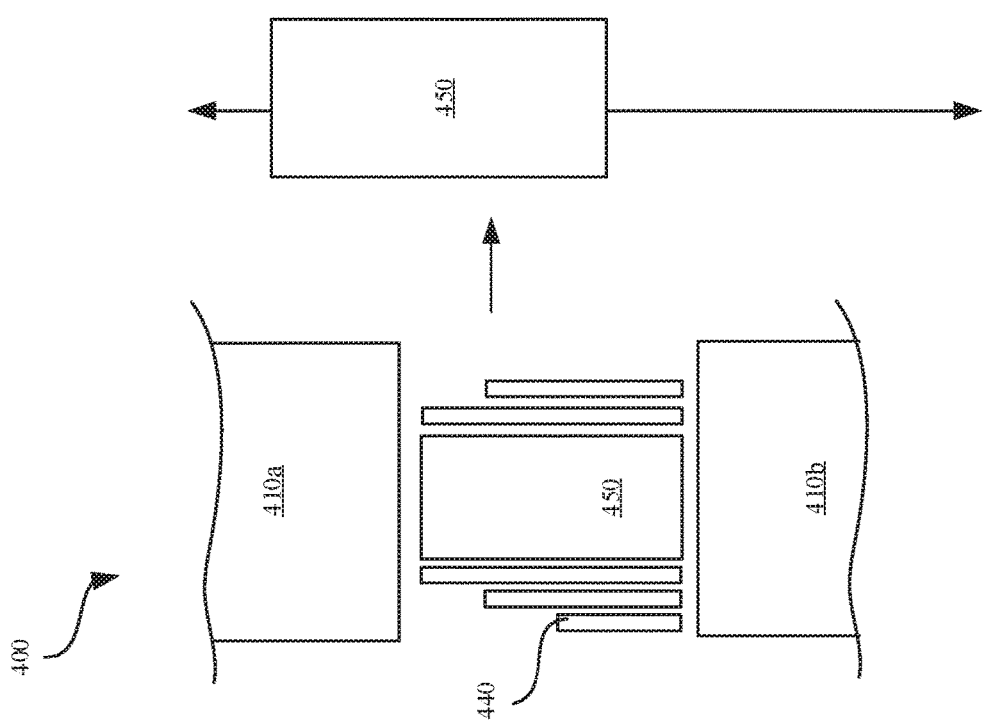

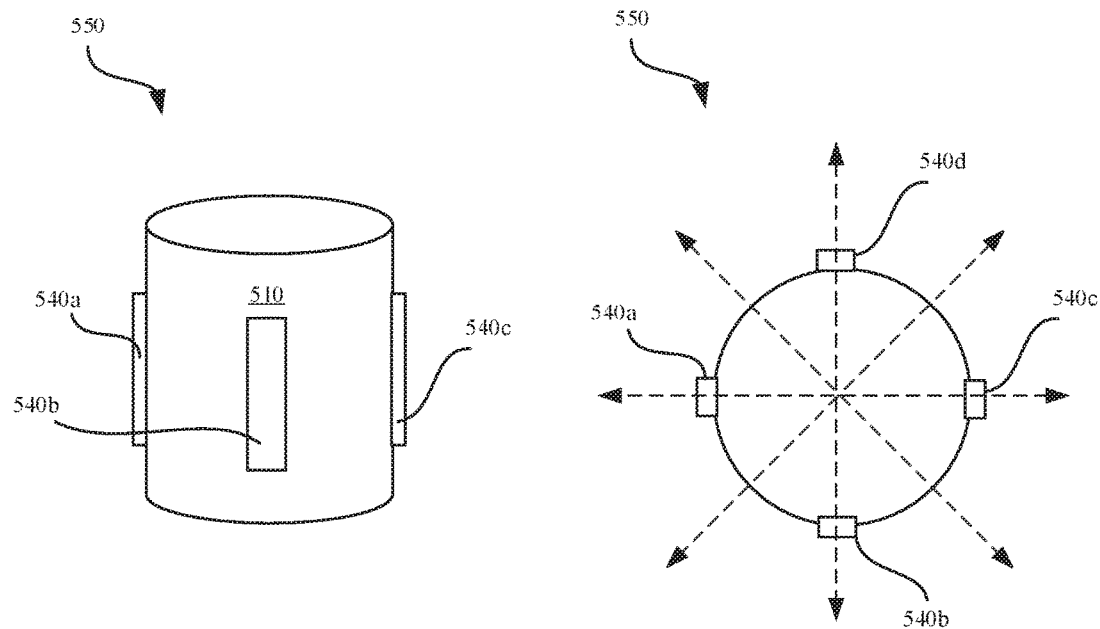
*FIG. 5A*
*FIG. 5C*
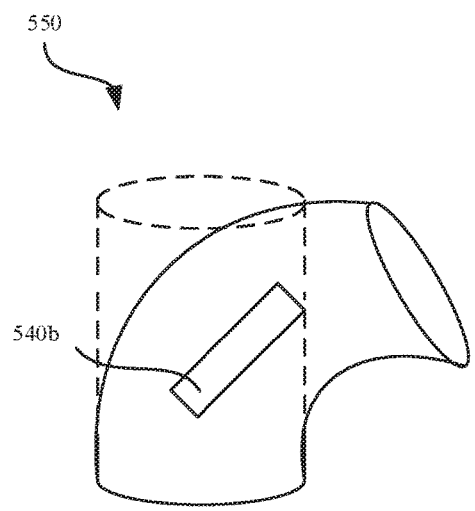
*FIG. 5B*

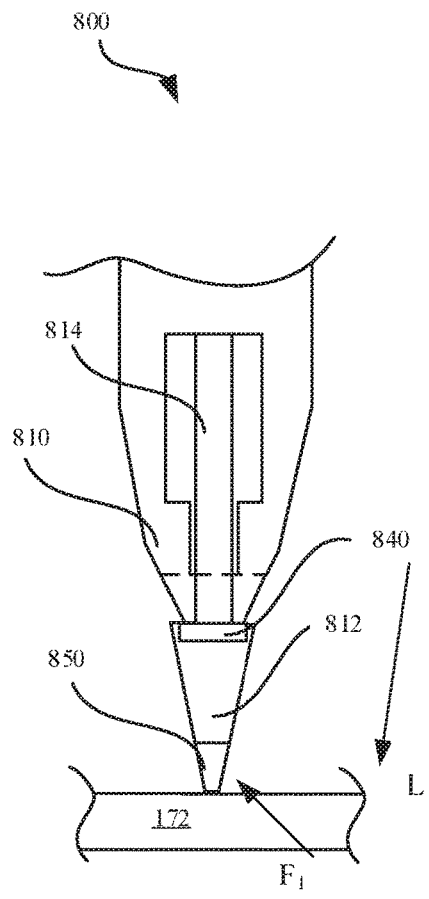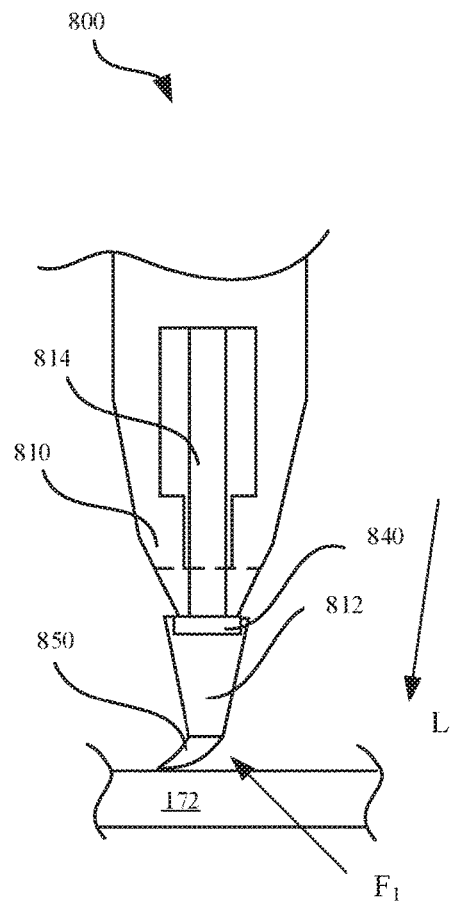
*FIG. 8A*  *FIG. 8B*

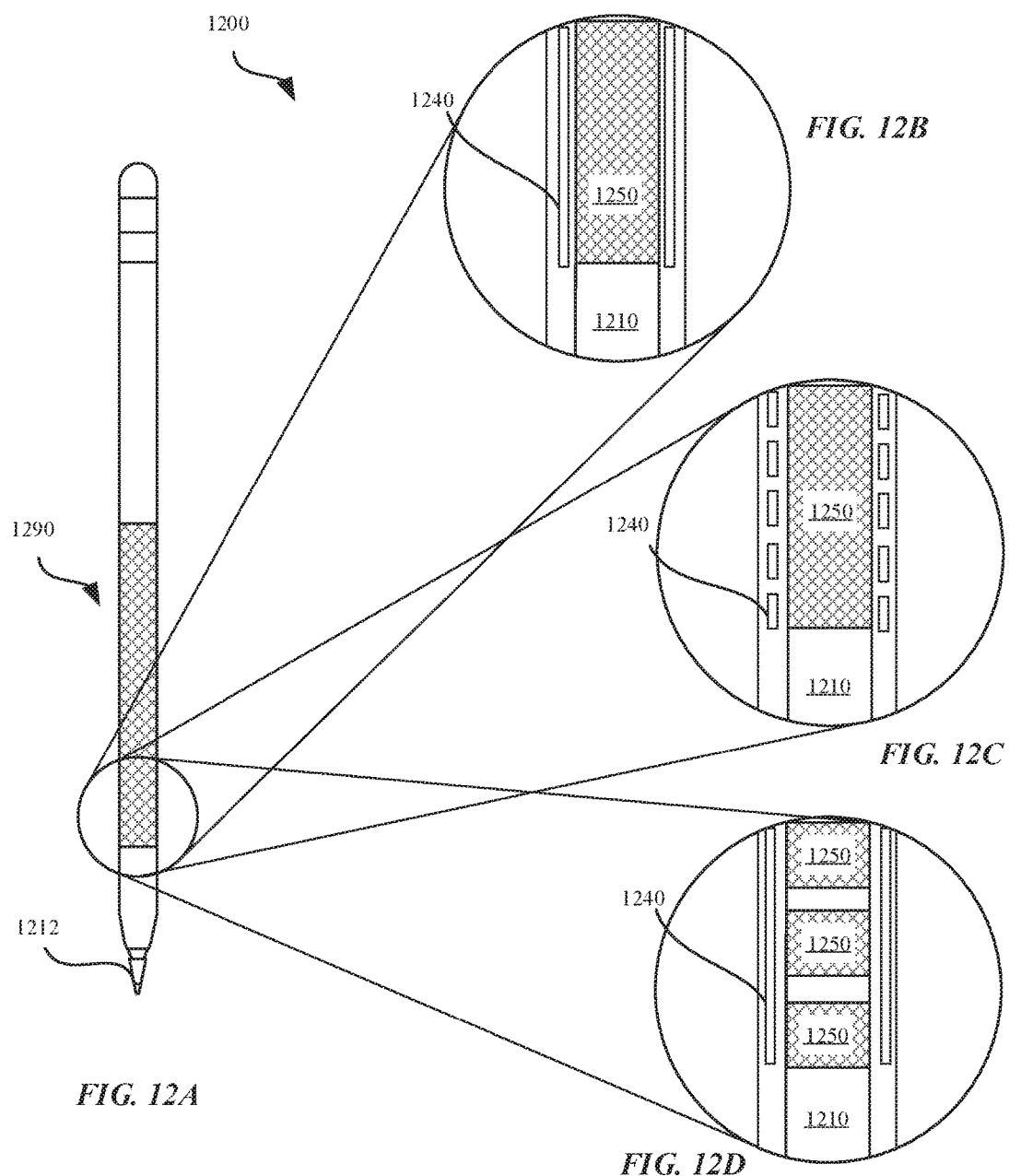

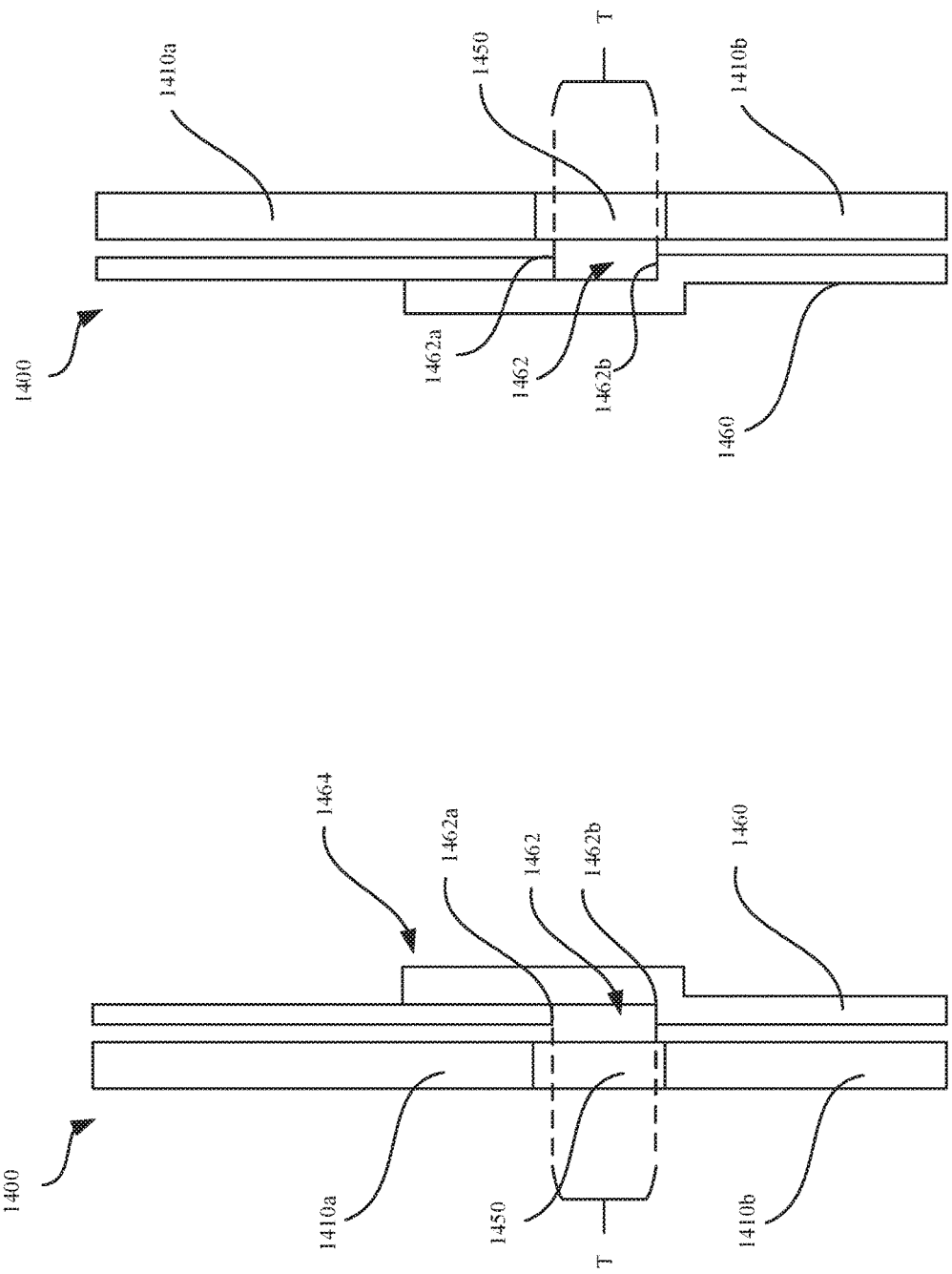

STIFFNESS RENDERING FOR A PENCIL

CROSS-REFERENCE TO RELATED APPLICATIONS

The present application is a continuation of U.S. patent application Ser. No. 15/592,029, entitled "STIFFNESS RENDERING FOR A PENCIL," filed May 10, 2017, which claims the benefit of U.S. Provisional Application No. 62/397,243, entitled "STIFFNESS RENDERING FOR A PENCIL," filed Sep. 20, 2016, the contents of which are incorporated by reference in its entirety for all purposes.

This application is related to U.S. patent application Ser. No. 15/593,240, entitled "APPLE PENCIL HAPTICS", by Taylor et al. filed May 11, 2017, U.S. patent application Ser. No. 15/593,219, entitled "STYLUS WITH MULTIPLE INPUTS", by Sundaram et al. filed May 11, 2017, and U.S. patent application Ser. No. 15/593,225, entitled "ACOUSTICS TO MATCH PENCIL/STYLUS INPUT", by Wang et al. filed May 11, 2017, the contents of which are incorporated by reference herein in their entirety for all purposes.

FIELD

The described embodiments relate to an accessory device having a feedback component. More specifically, the accessory device can detect a contact stimulus that is applied to a housing of the accessory device, and the feedback component can generate tangible feedback at the housing that is based on the contact stimulus.

BACKGROUND

Conventional electronic devices can include feedback components that are configured to generate user feedback so as to improve the overall user experience. However, the feedback generated by such conventional feedback components is in isolation to the environment external to the electronic device. Accordingly, there is a need for enhancing the user's experience by implementing feedback components in electronic devices that are capable of generating tangible feedback that is based on an amount of user contact with the electronic device.

SUMMARY

This paper describes various embodiments related to an accessory device having a feedback component. More specifically, the accessory device can detect a contact stimulus that is applied to a housing of the accessory device, and the feedback component can generate tangible feedback at the housing that is based on the contact stimulus.

According to some embodiments, an accessory device for use with a touch sensitive portion of an electronic device is described. The accessory device can include a housing having walls that carry operational components, where the operational components can include a processor coupled to a feedback component arranged to provide feedback and a distal tip coupled to the feedback component, the distal tip extending from an opening at a distal end of the housing, where the distal tip is capable of engaging with and transmitting a load applied to the housing to an external surface of the touch sensitive portion. The processor can be further coupled to a sensor in communication with the distal tip, the sensor being capable of (i) detecting a physical change when the distal tip engages with the external surface, and (ii) responding to the physical change by providing a detection signal to the processor, that, in response, instructs the feedback component to provide the feedback to the distal tip.

According to some embodiments, an electronic pencil is described. The electronic pencil can include a housing capable of carrying operational components, where the operational components can include a processor capable of providing operational instructions and a sensor coupled to the processor. The sensor can be capable of detecting a stimulus applied to the housing and responding by (i) determining properties of the stimulus, and (ii) providing an instruction in accordance with the properties of the stimulus to the processor. The operational components can further include a feedback component that is responsive to the instruction received from the processor, where the instruction causes the feedback component to alter a physical characteristic of the housing according to the properties of the stimulus.

According to some embodiments, a method for generating feedback at an accessory device that includes a housing, a sensor carried by walls of the housing, a feedback component that provides a feedback force, and a processor in communication with the sensor and the feedback component, is described. The method can include in response to detecting, by the sensor, a stimulus that originates outside the housing: receiving, by the processor, a detection signal from the sensor, and instructing, by the processor, the feedback component to provide an amount of feedback force in accordance with the stimulus to the walls of the housing.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The disclosure will be readily understood by the following detailed description in conjunction with the accompanying drawings, wherein like reference numerals designate like structural elements, and in which:

FIGS. 3A-3C illustrate cross-sectional views of a touch sensitive device for generating deformation feedback, in accordance with some embodiments.

FIGS. 4A-4D illustrate cross-sectional views of a touch sensitive device for generating deformation feedback, in accordance with some embodiments.

FIGS. 5A-5C illustrate various views of a piezoelectric element for generating deformation feedback, in accordance with some embodiments.

FIGS. 8A-8B illustrate cross-sectional views of a touch sensitive device for generating deformation feedback, in accordance with some embodiments.

FIGS. 12A-12D illustrate cross-sectional views of a touch sensitive device for generating deformation feedback, in accordance with some embodiments.

FIGS. 14A-14B illustrate cross-sectional views of a touch sensitive device for generating deformation feedback, in accordance with some embodiments.

Figure 1:
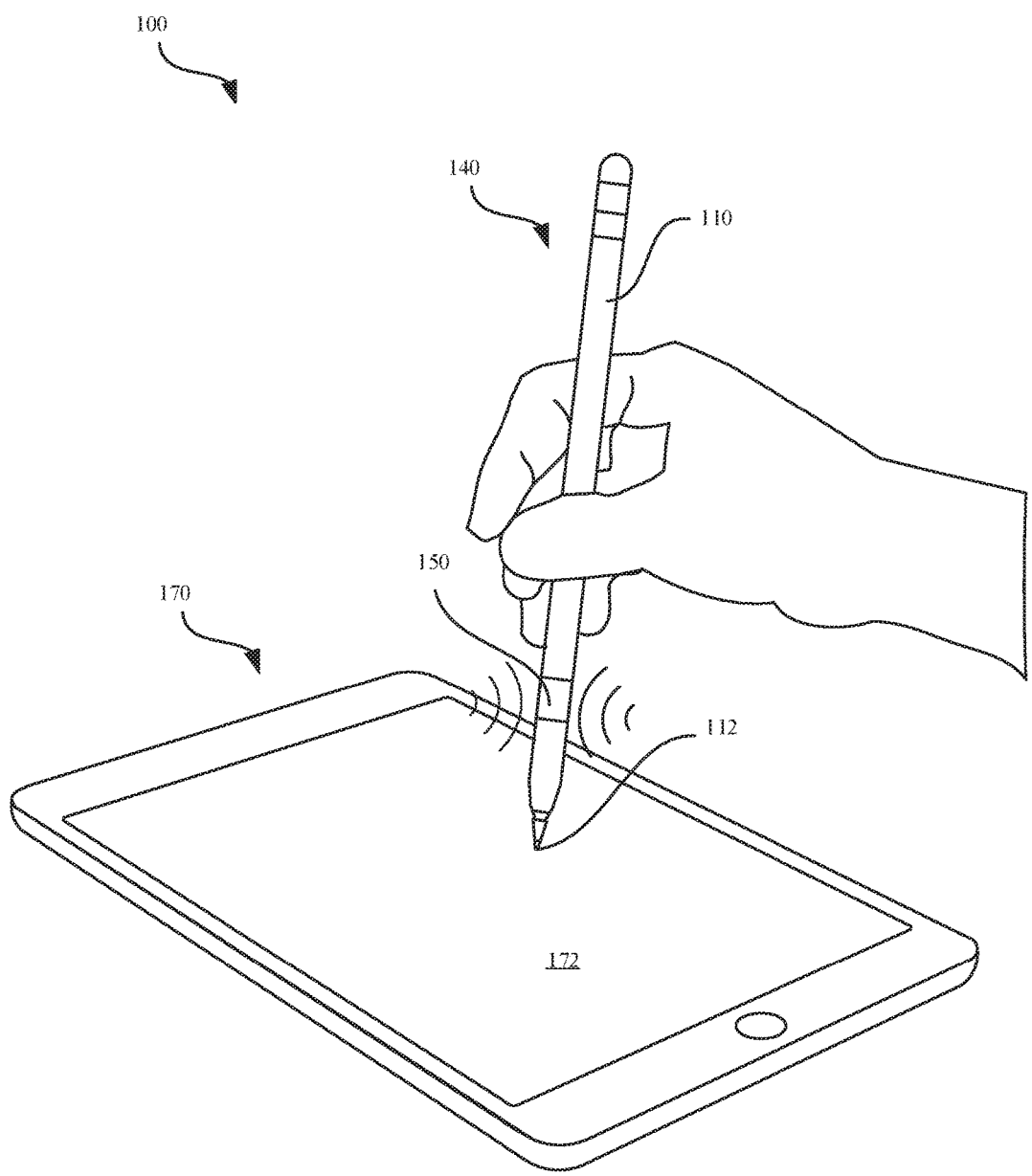
FIG. 1 illustrates a perspective view of a system for generating deformation feedback, in accordance with some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments of an accessory device including a deformation feedback component. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

Conventional electronic devices can include a variety of different feedback components for stimulating a variety of a user's senses. Additionally, such electronic devices can include haptic feedback components for stimulating the user's sense of touch. While such haptic feedback components can stimulate the nerves within the user's appendages by applying force, vibrations, or motions that can be perceived by the user, the feedback that is generated by the haptic feedback components is generally static and inflexible, as well as the feedback generated is in isolation to the environment external to the electronic device. In one example, the external environment can refer to an amount of contact (e.g., strain or pressure) that is applied by the user against a housing of the electronic device. Haptic feedback components found in conventional electronic devices are non-responsive to such contact that is applied to the housing, and thus the haptic feedback components are incapable of altering an amount of feedback according to the contact. Therefore, conventional electronic devices are unable to contribute to the overall user experience.

Accordingly, there is a need for electronic devices to include more sophisticated feedback mechanisms and components for providing user feedback that is responsive to the user's physical interaction with such electronic devices. The techniques and components described herein can enable electronic devices to detect an amount of user contact that is applied to a part of the electronic device (e.g., housing, distal tip, proximal tip, etc.) and generate an amount of tactile feedback based on the amount of contact. Such techniques and components may be beneficial to graphical artists drawing with an electronic stylus, where the digital representations of their graphical designs is heavily dependent upon the amount of tactile feedback that they receive during the drawing. One of the components described herein is a "deformation feedback component" which can be interchangeably used with the term "feedback component", and refers to adjusting an amount of feedback by a feedback component according to the amount of a contact stimulus that is applied against the part of the electronic device.

As used herein, the terms "initial configuration," "initial shape," or "non-modified shape" can be used interchangeably to refer to a deformation feedback component in a non-actuated state. In one example, in the absence of any electrical, magnetic, or electromechanical stimulation, the deformation feedback component remains in an initial configuration. Alternatively, the terms "modified configuration," "modified shape," or "adjusted shape" can be used interchangeably to refer to a deformation feedback component while being currently actuated or just subsequent to having been previously actuated. The initial configuration is generally distinct from the modified configuration, with respect to at least one of dimensions, shape, size, volume, or area of the feedback component.

As used herein, the term "deformation feedback" generally refers to user feedback that is generated based on detecting a contact stimulus or contact event that is applied to a part of the electronic device. As described herein, deformation feedback can refer to the transformation of a body of material (i.e., substrate) from an initial configuration to a modified configuration in order to provide feedback that can be perceived by a user. Deformation can correspond to a relative displacement of particles in the substrate. Deformation of the substrate can be measured using a number of different factors, including strain, stiffness, flexibility, and the like. In some embodiments, the physical deformation of the electronic device refers to strain being exerted against a housing, tip, or other part of the electronic device. In some embodiments, the physical deformation refers to exerting pressure against the housing, tip, or other part of the electronic device. In some embodiments, the contact stimulus causes a physical deformation of the part of the electronic device, such as the squeezing a barrel of the housing. The deformation feedback that is generated by a deformation feedback component can refer to a physical change (e.g., increase or decrease) in the feedback component's shape, dimensions, size, mass, volume, or footprint. The deformation feedback can simulate a sensation of touch at a user's nerves present in the user's appendages (e.g., fingers, hand, palm, toes, etc.) as well as other body parts (e.g., lips, nose, etc.). As described herein, the deformation feedback can apply a sensation of touch by applying force, vibratory force, motions, pressure, strain, or other types of physical feedback that can be physically perceived by the user.

As used herein, the term "haptic feedback" can refer to simulating a sensation of touch by applying force, vibrations, or motions that can be perceived by the user's appendages. Unlike deformation feedback, haptic feedback is not based on the contact stimulus or contact event that is applied to a part of the electronic device. Thus, the amount of haptic feedback generated disregards an amount of physical input applied by the user.

As used herein, the term "substrate" can refer to a piezoelectric element, magnetic element, electroactive substrate, magnetic actuation element, and the like that make up the active part of the deformation feedback component. In some embodiments, the substrate is physically deformed via at least one of electrical, electromechanical, pressurized, or magnetic actuation. In some embodiments, the deformation or actuation of the substrate can cause an amount of force to be exerted or translated to a housing of the electronic device.

As used herein, the term "strain" refers to a relative displacement of particles in a substrate from an initial configuration to a modified configuration. As used herein, the term "stiffness" refers to the rigidity of the substrate, and the extent to which the substrate resists deformation in response to an applied force. In some examples, the substrate can be made of a material that can be configured to generate a varied amount of rigidity or flexibility that can similarly be perceived by the user. For example, the change in rigidity or flexibility of the substrate can correspond to a similar change in stiffness or deformability of a housing of the touch sensitive device. As described herein, the term strain can refer to the amount of deformation of the electroactive substrate in the direction of the applied force divided by the initial length of the electroactive substrate.

According to some embodiments, an accessory device for use with a touch sensitive portion of an electronic device is described. The accessory device can include a housing having walls that carry operational components, where the operational components can include a processor coupled to a feedback component arranged to provide feedback and a distal tip coupled to the feedback component, the distal tip extending from an opening at a distal end of the housing, where the distal tip is capable of engaging with and transmitting a load applied to the housing to an external surface of the touch sensitive portion. The processor can be further coupled to a sensor in communication with the distal tip, the sensor being capable of (i) detecting a physical change when the distal tip engages with the external surface, and (ii) responding to the physical change by providing a detection signal to the processor, that, in response, instructs the feedback component to provide the feedback to the distal tip.

The various embodiments set forth herein are provided to generate an amount of feedback at a deformation feedback component of an electronic device in accordance with an amount of strain, pressure, or force that is exerted against a housing of the electronic device. Exemplary electronic devices that can include the deformation feedback component can include, but are not limited to, portable electronic devices, styluses, smartphones, smartwatches, consumer devices, wearable electronic devices, tablet computers, laptops, computing devices, and the like, such as those manufactured by Apple Inc., based in Cupertino, Calif.

The foregoing provides various electronic devices capable of providing an amount of deformation feedback. A more detailed discussion of these electronic devices is set forth below and described with reference to FIGS. 1-25, which illustrate detailed diagrams of devices and components that can be used to implement these techniques and features.

FIG. 1 illustrates a perspective view of a system 100 for generating deformation feedback by a touch sensitive device 140. In some examples, the touch sensitive device 140 can refer to a stylus, such as the Apple Pencil® manufactured by Apple Inc. The touch sensitive device 140 includes a deformation feedback component 150 that can be configured to undergo a transformation from an initial configuration to a modified configuration. In some embodiments, the deformation feedback component 150 can be configured to provide deformation feedback in conjunction with contact between the touch sensitive device 140 and the electronic device 170.

Although FIG. 1 shows that the deformation feedback component 150 is positioned near a tip 112 located at a distal end of the touch sensitive device 140, the deformation feedback component 150 can be positioned along any portion of the touch sensitive device 140. In some examples, the deformation feedback component 150 can be positioned at the proximal end, the tip 112, and along a longitudinal length of the housing 110 of the touch sensitive device 140, as described herein. In this manner, positioning the deformation feedback component 150 at different areas along the housing 110 can generate perceptions of different types/amounts of deformation feedback that can be perceived by the user's appendage(s).

In some embodiments, the touch sensitive device 140 can incorporate multiple deformation feedback components 150 that are each positioned at different portions of the housing 110. In some embodiments, one or more multiple deformation feedback components 150 can be positioned radially along the housing 110 to span the entire circumference of a cylindrical housing or to span the entire perimeter of the housing 110. In some embodiments, the deformation feedback component 150 can positioned at an external surface of the housing 110, embedded within the external surface of the housing 110, along an internal surface of the housing 110, disposed within an interior cavity of the housing 110, or a combination thereof.

In some embodiments, where the deformation feedback component 150 is an electroactive substrate, the electroactive substrate can be included as part of a transducer assembly. In some embodiments, the electroactive substrate can be configured to detect an amount of mechanical strain and/or force that is applied to the electroactive substrate via e.g., the user's appendage. For example, the electroactive substrate can detect an amount of mechanical strain and/or force that is directly or indirectly applied to the electroactive substrate. For example, indirect application of mechanical strain and/or force can refer to a portion of the housing 110 or other component of the touch sensitive device 140 that presses against the electroactive substrate.

In some embodiments, the touch sensitive device 140 can include a sensor (not illustrated) that can be configured to detect an amount of capacitance, resistance, or combination thereof that is in conjunction with the amount of mechanical strain that is exerted against the electroactive substrate. For example, an amount of deflection of a portion of the electroactive substrate can be detected by one or more electrodes (not illustrated) positioned adjacent to the electroactive substrate that are configured to transmit an electrical signal to the sensor in accordance with the amount of the mechanical strain that is detected.

In some embodiments, the electroactive substrate can be configured to generate deformation feedback in accordance with the amount of mechanical strain or deflection that is applied to the electroactive substrate. In this manner, the electroactive substrate can be configured to perform both force sensing and deformation feedback functions.

In some embodiments, the electroactive substrate can be configured to generate haptic feedback in addition to/or in substitution of the deformation feedback.

In some embodiments, the touch sensitive device 140 includes a tip electrode (not illustrated) that is configured to detect an amount of load that is applied by the touch sensitive device 140 against the touch screen panel 172 of the electronic device 170. In response, the deformation feedback component 150 can be configured to generate deformation feedback in accordance with the amount of load that is detected. In some embodiments, the touch sensitive device 140 can be configured to detect an amount of force that is exerted by the touch screen panel 172 against the tip 112. In response, the deformation feedback component 150 can be configured to generate deformation feedback in accordance with the amount of force that is exerted on the tip 112. In some embodiments, the touch sensitive device 140 can include a position sensor (e.g., accelerometer, gyroscope, and the like) that can be used in addition to the tip electrode or to substitute for the tip electrode for detecting at least one of a change in position, velocity, acceleration, or direction of the touch sensitive device 140.

In some embodiments, the touch sensitive device 140 can be configured to electronically communicate or interact with the electronic device 170, where the electronic device 170 can determine the deformation feedback to be generated by the electroactive substrate. In one example, the electronic device 170 can be configured to execute a media application (e.g., via an operating system installed on the electronic device 170). In one example, the media application can be configured to receive a selection of a feedback preference that can be utilized in generating the deformation feedback.

Figure 2A:
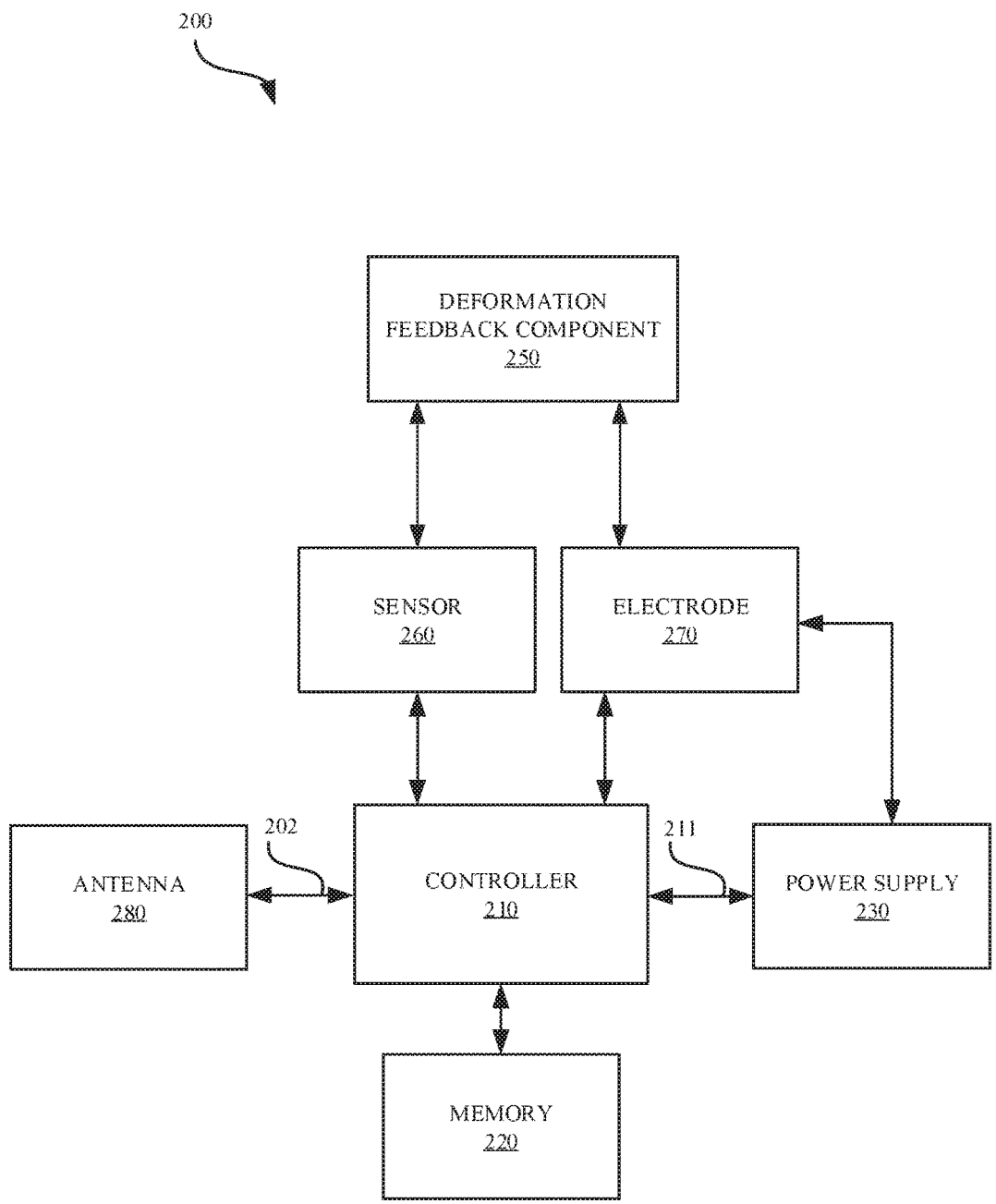
FIGS. 2A-2B illustrate system views of a touch sensitive device for generating deformation feedback, in accordance with some embodiments.
Figure 2B:
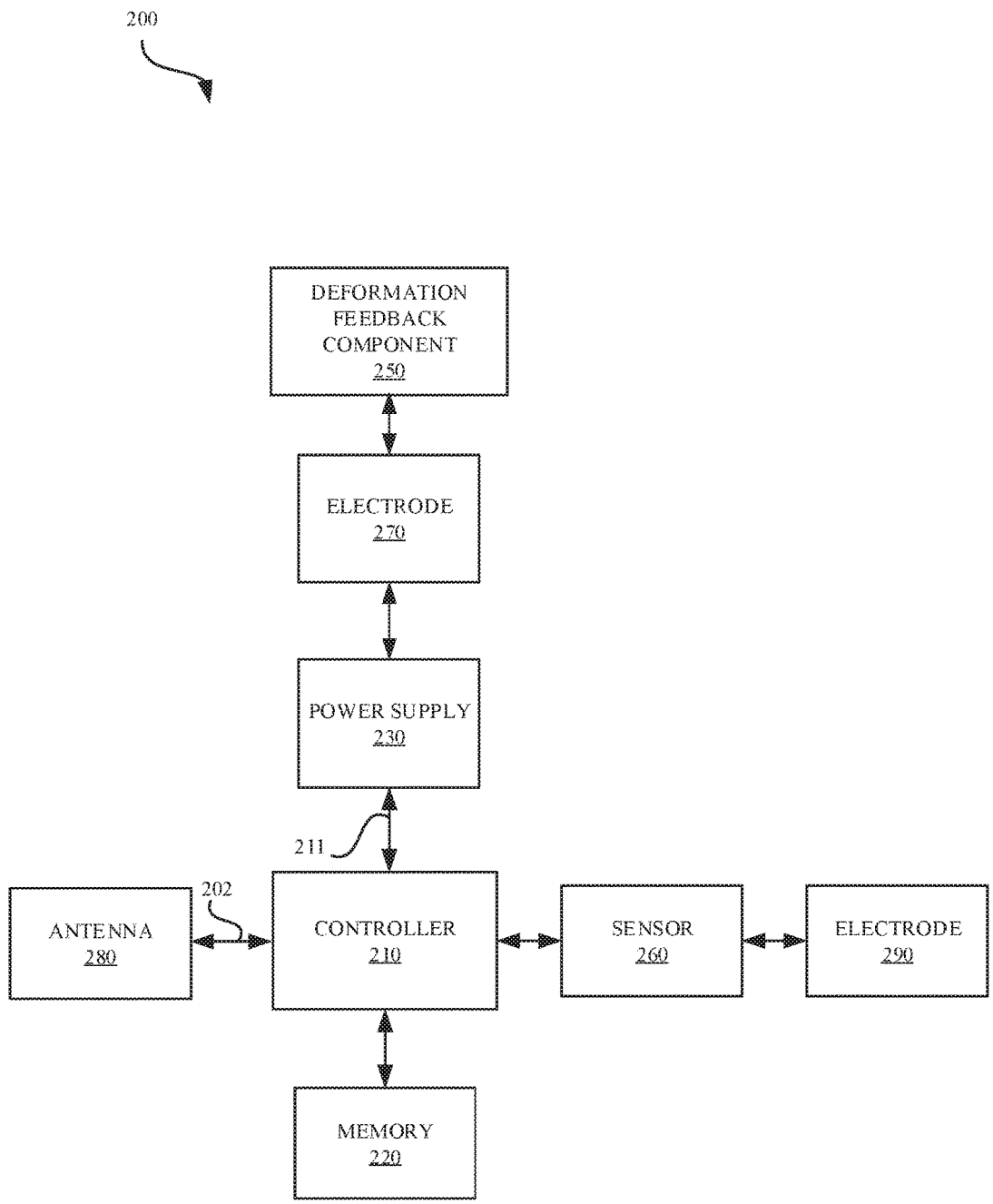

FIGS. 2A-2B illustrate block diagrams of various embodiments of a touch sensitive device 200 that can be used to implement the various components described herein. FIG. 2A illustrates a touch sensitive device 200 having a deformation feedback component 250, where the deformation feedback component 250 can include an electroactive substrate that can be configured to perform both force/load sensing and deformation feedback functions. As shown in FIG. 2A, the touch sensitive device 200 can include a controller 210 for controlling the overall operation of the touch sensitive device 200. The controller 210 can refer to one or more of a general processor unit (GPU), central processing unit (CPU), or dedicated microcontroller. The controller 210 can be configured to receive an electrical signal from a sensor 260, where the electrical signal corresponds to a change in capacitance, resistance, or combination thereof that is detected by the sensor 260 in conjunction with the force/load that is detected by the sensor 260. The sensor 260 can be electrically coupled to one or more electrodes 270 that are positioned adjacent to the deformation feedback component 250. The one or more electrodes 270 can be configured to generate an electrical signal that corresponds to an amount of force or mechanical strain that is directly or indirectly applied against the deformation feedback component 250, whereupon the electrical signal is transmitted to the sensor 260. In this manner, the deformation feedback component 250 can be configured to detect an amount of mechanical strain or deflection that is directly or indirectly exerted against the electroactive substrate. The controller 210 can be configured to generate one or more contact parameters based on the change in capacitance, resistance, or combination thereof. For example, the contact parameter can refer to an amount of force, load, strain, and the like that is applied against the electroactive substrate. In another example, the contact parameter can refer to a directionality, orientation, or angular direction of the force that is applied against the electroactive substrate. In some examples, the controller 210 can be configured to sense orientation since mechanical strain of the electroactive substrate can cause tension on one lateral side of the electroactive substrate and compression on an opposing lateral side.

In some embodiments, the controller 210 can be configured to generate one or more deformation feedback parameter based on the one or more contact parameters. The deformation feedback parameters can be transmitted to a power supply 230. The deformation feedback parameters can refer to an electrical signal that indicates an amount of voltage, amplitude, pulse width, duty cycle, and the like. In conjunction with receiving the deformation feedback parameters, the power supply 230 can generate an input voltage to the electrodes 270 so that the electrodes 270 are configured to actuate the deformation feedback component 250 to transform from an initial configuration (i.e., non-actuated) to a modified configuration (i.e., actuated) so as to generate deformation feedback. In this configuration, the deformation feedback component 250 can be configured to perform both force sensing and deformation feedback functions where the deformation feedback component is comprised of an electroactive substrate.

In some embodiments, the controller 210 of the touch sensitive device 200 can be configured to receive one or more feedback preferences from the electronic device 170. In some examples, the feedback preference is selected via the media application of the electronic device 170. The controller 210 can receive the feedback preference from the electronic device 170 via a wireless antenna 280, whereupon the controller 210 can be configured to combine the one or more feedback preferences with the one or more contact parameters to generate a combined deformation feedback parameter. In this manner, the touch sensitive device 200 can be configured to cause the deformation feedback component 250 to generate deformation feedback that is not entirely based on the contact parameter. The touch sensitive device

200 can also include a network/bus interface 202 that couples the wireless antenna 280 to the controller 210. The controller 210 can be electrically coupled to a power supply 230 via a bus 211.

In some embodiments, the touch sensitive device 200 includes a memory 220 that can be configured to store the one or more contact parameters and/or the one or more feedback preferences.

FIG. 2B illustrates a touch sensitive device 200 that includes a tip electrode 290 that is configured to detect an amount of load that is applied by the touch sensitive device 200 against the touch screen panel 172 of the electronic device 170, as well as detect an amount of force that is exerted by the touch screen panel 172 against the tip 112. In some embodiments, the tip electrode 290 can be configured to detect a change in capacitance, voltage difference, resistance, and the like. The tip electrode 290 can transmit an electrical signal to a sensor 260 that is indicative of the change in capacitance, voltage difference, or resistance. The sensor 260 can be configured to generate an electrical signal that is transmitted to the controller 210. The controller 210 can be configured to generate one or more contact parameters based on the change in capacitance, resistance, or combination thereof. For example, the contact parameter can refer to an amount of force, load, strain, and the like that is present at the tip 112 of the touch sensitive device 140. In another example, the contact parameter can refer to a directionality, orientation, or angular direction of the force that is applied to the tip 112.

In some embodiments, the controller 210 can be configured to generate one or more deformation feedback parameter based on the one or more contact parameters. The deformation feedback parameters can be transmitted to a power supply 230. The deformation feedback parameters can refer to an electrical signal that indicates an amount of voltage, amplitude, pulse width, duty cycle, and the like. In conjunction with receiving the deformation feedback parameters, the power supply 230 can generate an input voltage to the electrodes 270 so that the electrodes 270 are configured to actuate the deformation feedback component 250 to transform from an initial configuration (i.e., non-actuated) to a modified configuration (i.e., actuated) so as to cause the deformation feedback component 250 to generate deformation feedback. In one example, where the deformation feedback component 250 is an electroactive substrate, the electroactive substrate can be configured to expand and/or contract to induce strain on the housing 110 of the touch sensitive device 140 that can be perceived by the user's appendage. In this manner, the electroactive substrate is reactive to produce deformation feedback as sensed by the sensor 260.

In some examples, the deformation feedback component 250 can be comprised of an electroactive substrate, a rheological fluid, shape memory alloy, magnetic assembly, or piezoelectric element. In some examples, the electroactive substrate can be comprised of silicone, acrylates, and/or polyurethane materials.

In some embodiments, the electrodes 270 can be configured to generate an electrostatic force relative to the electroactive substrate to cause the electroactive substrate to expand or contract.

In some embodiments, the electroactive substrate can be configured to generate haptic feedback in addition to/or in substitution of the deformation feedback. For example, the power supply 230 can be configured to cause a pulsating or repeating voltage to be transmitted to the electroactive substrate so as to cause changes in stiffness or compression in the electroactive substrate. In some embodiments, the power supply 230 can apply a single electrical pulse to the electroactive substrate to simulate a click. In some embodiments, the power supply 230 can apply continuous and repeating electrical pulses (e.g., AC, DC) to cause the electroactive substrate to simulate textures. The repeating waveform can induce a change in stiffness to the housing 110 via the deformation feedback component 250. In this manner, the electroactive substrate can be induced to generate haptic feedback by adjusting the type of voltage that is provided by the power supply 230. For example, the feedback can be translated to the user via the housing 110 of the touch sensitive device 200. Thus, by adjusting the type of input voltage that is provided, different types of textures can be perceived by the user.

In some examples, the controller 210 is able to generate feedback by the deformation feedback component 250, in response to the sensor 260 detecting that contact has been made, in less than about 500 milliseconds. In some examples, feedback time from detecting contact by the sensor 260 to generating feedback by the deformation feedback component 250 is between about 1 millisecond to about 100 milliseconds. In some examples, the feedback time can refer to a range of milliseconds or microseconds.

In some embodiments, a touch sensitive device 200 can incorporate any combination of the features of the touch sensitive device 200 described with reference to FIGS. 2A-2B.

FIGS. 3A-3C illustrate cross-sectional views of various embodiments of a touch sensitive device 300, in accordance with some embodiments. FIGS. 3A-3C illustrate that positioning a plurality of electrodes 340a-b relative to an electroactive substrate 350 can induce moment of the electroactive substrate 350 in a plurality of different directions along a load path.

FIG. 3A illustrates a touch sensitive device 300 that includes a housing 310a-b that includes an electroactive substrate 350 and a plurality of electrodes 340a-b positioned adjacent to the electroactive substrate 350. The upper and lower surface of the electroactive substrate 350 are bordered by an upper and lower portion of a housing 310a-b.

A first electrode 340a can be configured to deliver a positive charge to a first surface of the electroactive substrate 350, while a second electrode 340b can be configured to deliver a negative charge to a second surface of the electroactive substrate 350. In some embodiments, the electrodes 340a-b can be configured to generate an electrostatic force relative to the electroactive substrate 350. As a result, actuation of the electroactive substrate 350 can cause the upper and lower surfaces of the electroactive substrate 350 to expand in an axial direction towards the upper and lower portions of the housing 310a-b. Expansion of the electroactive substrate 350 causes the electroactive substrate 350 to be transformed from an initial configuration to a modified configuration. Since the upper and lower portions of the housing 310a-b provide a fixed boundary, the expansion of the electroactive substrate 350 towards the upper and lower portions of the housing 310a-b pushes against the housing 310a-b to induce an amount of strain or stiffness against the upper and lower portions of the housing 310a-b that can be perceived by the user.

In another example, the electroactive substrate 350 can be induced to contract if the polarity of the voltage generated by the electrodes 340a-b is reversed.

FIG. 3B illustrates a touch sensitive device 300 that includes a housing 310a-b that includes an electroactive substrate 350 and a plurality of electrodes 340a-b positioned adjacent to the electroactive substrate 350. The electroactive substrate 350 is bordered by a pair of electrodes 340a-b that are positioned along the upper and lower surfaces of the electroactive substrate 350. In addition, the upper and lower surface of the electroactive substrate 350 are bordered by an upper and lower portion of a housing 310a-b.

A first electrode 340a can be configured to deliver a positive charge to an upper surface of the electroactive substrate 350, while a second electrode 340b can be configured to deliver a negative charge to a lower surface of the electroactive substrate 350. As a result, the upper and lower surfaces of the electroactive substrate 350 can be configured to contract in an axial direction away from the upper and lower portions of the housing 310a-b. Contraction of the electroactive substrate 350 causes the electroactive substrate 350 to be transformed from an initial configuration to a modified configuration. In this manner, the contraction of the electroactive substrate 350 induces less strain against the housing 310a-b associated with the modified configuration than in the initial configuration.

FIG. 3C illustrates a touch sensitive device 300 that includes a housing 310a-b that includes an electroactive substrate 350 and a series of four electrodes 340a-d positioned adjacent to the electroactive substrate 350. The electroactive substrate 350 is bordered by the four electrodes 340a-d that are each positioned adjacent to a surface of the electroactive substrate 350. In addition, the upper and lower surface of the electroactive substrate 350 are bordered by an upper and lower portion of a housing 310a-b.

A first electrode 340a can be configured to deliver a positive charge to a lateral surface of the electroactive substrate 350, a second electrode 340b can be configured to deliver a positive charge to an upper surface of the electroactive substrate 350, a third electrode 340c can be configured to deliver a negative charge to a lateral surface of the electroactive substrate 350, and a fourth electrode 340d can be configured to deliver a negative charge to a lower surface of the electroactive substrate 350. In this manner, the touch sensitive device 300 can be configured to cause the electroactive substrate 350 to either expand or contract in an axial direction depending upon which of the specific electrodes 340a-d are actuated. In this manner, FIG. 3C shows that the depending the specific electrode that is actuated can cause compliance in a plurality of different directions.

Although FIGS. 3A-3C illustrate that the electroactive substrate 350 is substantially rectangular shaped, the electroactive substrate 350 can be formed in a variety of other shapes such as circular, elliptical, polygonal, asymmetric, and the like.

In addition, the electroactive substrate 350 can be configured to provide deformation feedback and load/force sensing in conjunction with an amount of mechanical strain that is applied against the electroactive substrate 350. For example, the plurality of electrodes 340a-b can be configured to generate an electrical signal that corresponds to the amount of mechanical strain that is applied against the electroactive substrate 350. The electrodes 340a-b can be configured to sense orientation (e.g., tension on side of the electroactive substrate 350 and compression on an opposing side of the electroactive substrate 350).

FIGS. 3A-3C illustrate that the electroactive substrate 350 is induced to contract or expand depending upon the amount of mechanical strain, force, or load that is applied to the electroactive substrate 350 and/or the tip 112. In some embodiments, each of the electrodes 340a-b can be individually actuated and controlled.

FIGS. 4A-4D illustrate cross-sectional views of various embodiments of a touch sensitive device 400 that is configured to generate deformation feedback. FIGS. 4A-4D illustrate that positioning a plurality of asymmetrically aligned electrodes 440 relative to an electroactive substrate 450 can induce moment of the electroactive substrate 450 in a plurality of different directions along a load path.

FIG. 4A shows a touch sensitive device 400 that includes an electroactive substrate 450 having an upper surface and a lower surface that is bordered by an upper portion 410a of a housing and a lower portion 410b of the housing, in accordance with some embodiments. Each of the lateral surfaces of the electroactive substrate 450 are bordered by a plurality of electrodes 440, although the plurality of electrodes 440 are included in an asymmetrical configuration. FIG. 4A shows that a first lateral surface of the electroactive substrate 450 is adjacent to three electrodes 440, while a second lateral surface of the electroactive substrate 450 is adjacent to two electrodes 440. The asymmetrical configuration of the electrodes 440 relative to the electroactive substrate 450 can induce an asymmetrical electrical field to be applied by the electrodes 440 to the electroactive substrate 450.

As shown in FIG. 4B, actuation of the electroactive substrate 450 by the asymmetrically configured electrodes 440 of FIG. 4A can cause the electroactive substrate 450 to expand in an uneven manner, such that a lower surface of the electroactive substrate 450 is configured to extend significantly further than the upper surface of the electroactive substrate 450. In this manner, actuation of the electroactive substrate 450 causes the lower surface of the electroactive substrate 450 to induce a greater amount of strain or compression against the lower portion 410b of the housing when compared to the upper portion 410a.

FIG. 4C shows a touch sensitive device 400 that includes an electroactive substrate 450 having an upper surface and a lower surface that is bordered by an upper portion 410a of a housing and a lower portion 410b of the housing, in accordance with some embodiments. Each of the lateral surfaces of the electroactive substrate 450 are bordered by a plurality of electrodes 440, although the plurality of electrodes 440 are included in an asymmetrical configuration. FIG. 4A shows that a first lateral surface of the electroactive substrate 450 includes three electrodes 440 that each have varying lengths, while a second lateral surface of the electroactive substrate 450 includes three electrodes 440 that each have varying lengths. The asymmetrical configuration of the electrodes 440 relative to the electroactive substrate 450 can induce an asymmetrical electrical field to be applied by the electrodes 440 to the electroactive substrate 450.

As shown in FIG. 4D, actuation of the electroactive substrate 450 by the asymmetrically configured electrodes 440 can cause the electroactive substrate 450 to expand in an uneven manner, such that the electroactive substrate 450 bends or flexes between the upper and lower surface of the electroactive substrate 450. In this manner, actuation of the electroactive substrate 450 can cause the electroactive substrate 450 to induce a lesser amount of strain against a first lateral surface 410c of the housing when compared to a second lateral surface 410d of the housing.

FIGS. 5A-5C illustrate various views of a piezoelectric element 550 that is configured to generate deformation feedback, in accordance with some embodiments. In some embodiments, the piezoelectric element 550 can be substituted for an electroactive substrate. Although it should be noted that unlike the piezoelectric element 550, the electroactive substrate can be configured to provide both sensing and deformation feedback functions.

FIG. 5A shows that the piezoelectric element 550 includes a plurality of electrodes 540a-c that are positioned along an external surface 510 of the piezoelectric element 550. Each of the plurality of electrodes 540a-c can be individually actuated so as to cause the piezoelectric element 550 to displace in a plurality of different directions that correspond to the specific electrode 540a, 540b, 540c that is actuated.

FIG. 5B shows that in conjunction with the electrode 540c being actuated, the piezoelectric element 550 bends in a direction that corresponds to the position of the electrode 540c. In some examples, the piezoelectric element 550 can be configured to bend in a specific direction depending upon at least one of the amplitude of the input voltage, polarity, pulse width, or pulse frequency generated by the electrodes 540a-c. In this manner, the piezoelectric element 550 can also be configured to bend in a direction opposite the position of the electrode 540c.

FIG. 5C shows that the piezoelectric element 550 can be configured to displace in a plurality of different directions depending upon which of the one or more electrodes 540a-d are actuated. For example, solely actuating the electrode 540d can cause the piezoelectric element 550 to bend in the direction towards the electrode 540d.

In some examples, the piezoelectric element 550 may demonstrate about 0.1% strain. In contrast, the strain generated by the electroactive substrate 350 is e.g., from about 10% to 20%.

In some examples, the electroactive substrate 350 can generate a quicker feedback response than the piezoelectric element since the electroactive substrate 350 is able to provide both sensing and feedback functionalities.

Figure 6C:
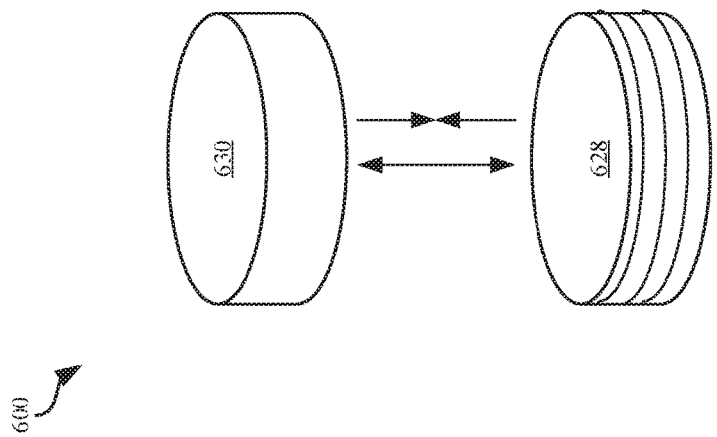
FIGS. 6A-6C illustrate various views a piezoelectric element and magnetic assembly for generating deformation feedback, in accordance with some embodiments.
Figure 6A:
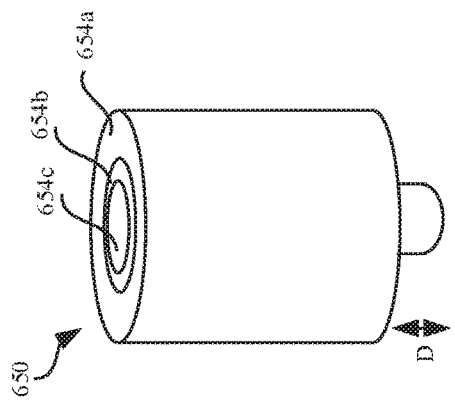
Figure 6B:
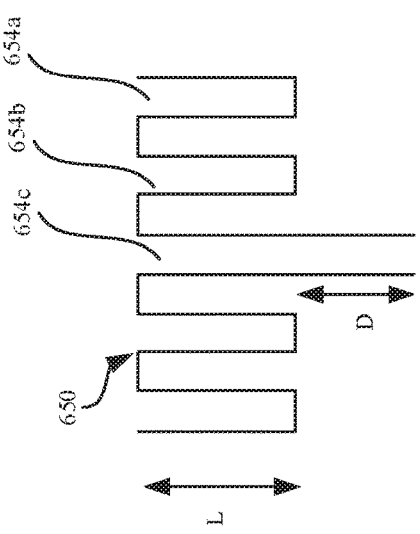

FIGS. 6A-6B illustrate a perspective view and a cross-sectional view of a piezoelectric element 650 that includes a plurality of concentric tubes 654a-c, in accordance with some embodiments. FIG. 6B shows a cross-sectional view of the piezoelectric element 650, where each of the concentric tubes 654a-c is defined by a length (L). The piezoelectric element 650 can be configured to displace by a distance (D) based on the total of the length (L) of each of the concentric rings tube-c. In this manner, the length of each of the concentric tubes 654a-c can amplify the displacement of the piezoelectric element 650.

FIG. 6C shows magnetic assembly 600 that can be configured to cause deformation feedback, in accordance with some embodiments. The magnetic assembly 600 can be implemented within the housing 110 of the touch sensitive device 140. In some embodiments, the actuation mode can refer to where the magnetic assembly 600 receives an electrical current from the power supply 230. In turn, the one or more magnetic coil elements 628 can be configured to generate a magnetic field. Depending upon at least one of a deformation feedback parameter generated by the controller 210, at least one of the polarity, amplitude, pulse or frequency of the current that is generated by the power supply 230 can be adjusted so that the one or more magnetic coil elements 628 can be configured to generate a varying magnetic field strength. Furthermore, each of the permanent magnetic elements 630 can generate its own magnetic field as well as interact with the magnetic field that is generated by other magnetic coil elements 628. For example, if the permanent magnetic element 630 and the magnetic coil elements 628 share a similar polarity, the permanent magnetic element 630 can be configured to oppose the magnetic coil element 628 so as to cause the permanent magnetic element 630 to repel from the magnetic coil element 628. In this manner, the permanent magnet element 630 can be repelled or attracted to the magnetic coil element 628 so as to cause an amount of compression or stiffness to be induced in the housing 110.

Figure 7A:
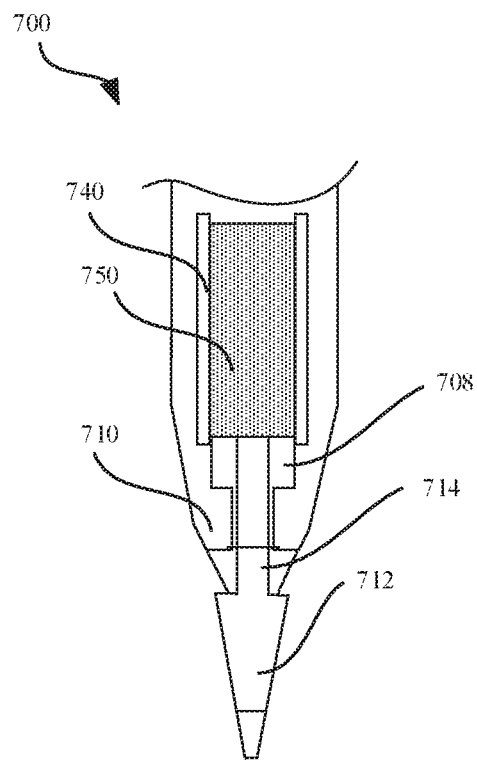
FIGS. 7A-7B illustrate cross-sectional views of a touch sensitive device for generating deformation feedback, in accordance with some embodiments.
Figure 7B:
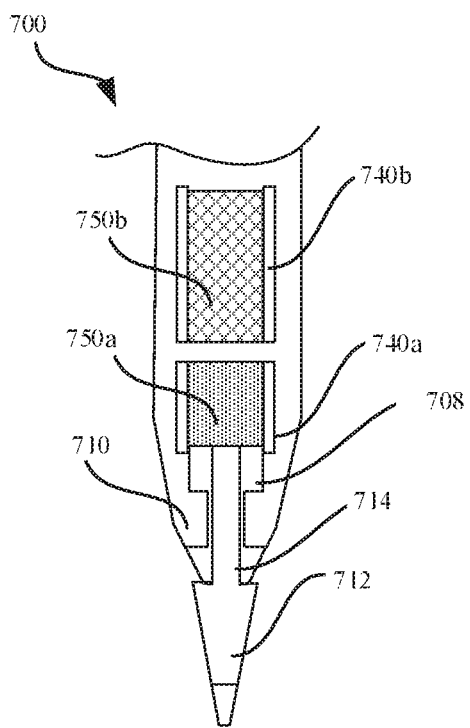

FIGS. 7A-7B illustrate cross-sectional views of various embodiments of a touch sensitive device 700 that can be configured to generate deformation feedback in conjunction with contact between the touch sensitive device 700 and a surface, such as the touch screen panel 172 of the electronic device 170.

FIG. 7A illustrates a touch sensitive device 700 that includes a single electroactive substrate 750 that can be configured to generate deformation feedback. FIG. 7A shows that the touch sensitive device 700 includes a housing 710 having an interior cavity 708. The interior cavity 708 includes the electroactive substrate 750 that is positioned between a pair of electrodes 740. Each electrode of the pair of electrodes 740 is positioned adjacent to a lateral surface of the electroactive substrate 750. In this manner, when at least one of the electrodes 740 delivers an input voltage to the electroactive substrate 750, the electroactive substrate 750 can be induced to expand or contract in a substantially axial direction to induce mechanical strain against the housing 710.

A distal tip 712 is coupled to a shaft 714 that extends along a length of the housing 710. In addition, the electroactive substrate 750 is coupled to the shaft 714 and the distal tip 712.

In some embodiments, the electroactive substrate 750 can be configured to perform both sensing and deformation feedback functions. For example, the electroactive substrate 750 can be configured to detect an amount of force or mechanical strain that is applied against the electroactive substrate 750 from at least one of the user's appendage or from the touch screen panel 172. For example, in conjunction with contact between the distal tip 712 and the touch screen panel 172, the user's appendage can compress against the housing 710. As a result, the housing 710 can compress against the electroactive substrate 750 to cause mechanical strain that can be detected by the electroactive substrate 750. Subsequently, the electroactive substrate can also generate deformation feedback that corresponds to the amount of mechanical strain that is detected.

In some embodiments, the electroactive substrate 750 can be configured to solely generate deformation feedback in response to an amount of mechanical strain that is detected by a sensor 260. The touch sensitive device 700 can include a tip electrode 290 that is configured to detect a change in capacitance, resistance, or combination thereof in accordance with an amount of load that is exerted by the touch sensitive device 700 to a surface of another object (e.g., touch screen panel 172).

FIG. 7B illustrates another embodiment of a touch sensitive device 700 that includes a first electroactive substrate 740a and a second electroactive substrate 740b. Each of the electroactive substrates 740a, 740b can have a dedicated function. For example, the first electroactive substrate 740a can be configured to perform a sensing function by determining an amount of force or mechanical strain that is applied to the first electroactive substrate 740a, while the second electroactive substrate 740b can be configured to generate deformation feedback in accordance with the amount of force or mechanical strain that is detected by the first electroactive substrate 740a. Alternatively, the first electroactive substrate 740a can be configured to detect an amount of force or load that is applied against an area of the housing 710 that is adjacent to the first electroactive substrate 740*a*, while the second electroactive substrate 740*b* can be configured to detect an amount of force or load that is applied against an area of the housing 710 that is adjacent to the second electroactive substrate 740*b*.

FIGS. 8A-8B illustrate cross-sectional views of a touch sensitive device 800 that generates deformation feedback in conjunction with contact between the touch sensitive device 800 and the touch screen panel 172 of the electronic device, in accordance with some embodiments.

FIG. 8A shows that the touch sensitive device 800 includes a distal tip 812, where the distal tip 812 can be comprised of an electroactive substrate 850. Since the distal tip 812 can be comprised of an electroactive substrate 850, the electroactive substrate 850 can be configured to provide both sensing and deformation feedback functions. FIG. 8A shows that the touch sensitive device 800 includes a housing 810 having an interior cavity 808. A shaft 814 can extend through the interior cavity 808 and be coupled to the distal tip 812. The electroactive substrate 850 is positioned adjacent to an electrode 840, where the electrode 840 is positioned above the electroactive substrate 850. An amount of force (F) is directed towards the distal tip 812 from the touch screen panel 172, and an amount of load (L) is provided in a direction of a load path from the touch sensitive device 800 towards the touch screen panel 172. In some examples the amount of load (L) can be associated with an angle of touch down, as described in further detail with reference to FIGS. 22A-22C. FIG. 8A illustrates the electroactive substrate 850 in an initial configuration.

As shown in FIG. 8B, the controller 210 can be configured to generate one or more contact feedback parameters to cause the power supply 230 to generate an input voltage to the electroactive substrate 850. As a result, the electroactive substrate 850 can be configured to transform from an initial configuration to a modified configuration. As shown in FIG. 8B, in conjunction with the modified configuration, the electrode 840 causes the electroactive substrate 850 to bend in a direction that corresponds to the direction of the force (F) applied by the touch screen panel 172 and the direction of the load (L) characterized by the load path.

Figure 9B:
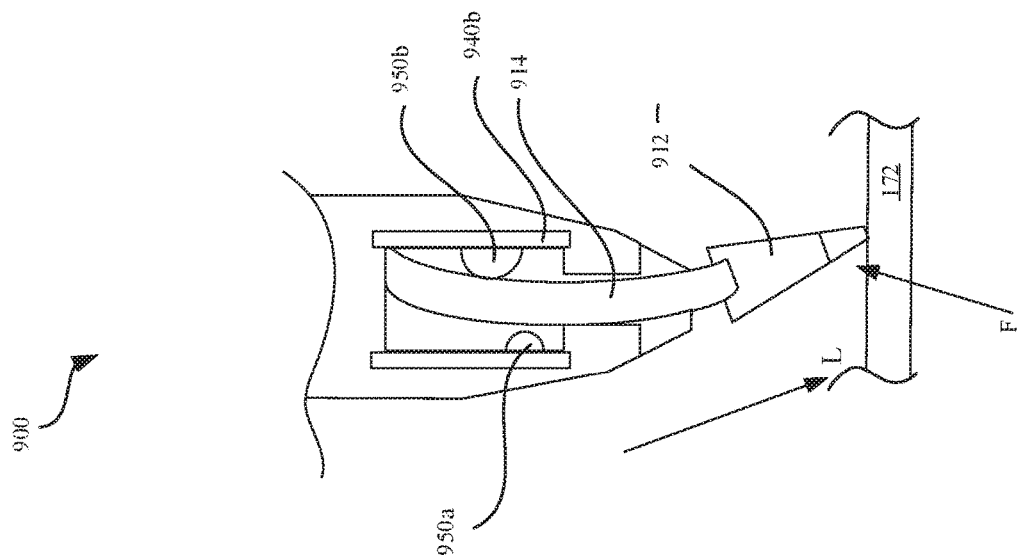
FIGS. 9A-9B illustrate cross-sectional views of a touch sensitive device for generating deformation feedback, in accordance with some embodiments.
Figure 9A:
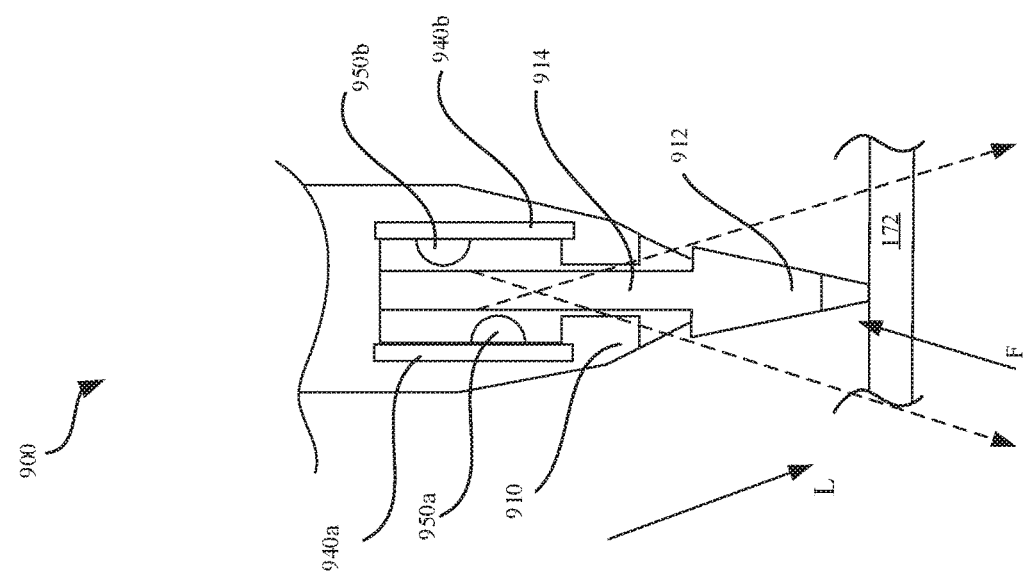

FIGS. 9A-9B illustrate cross-sectional views of a touch sensitive device 900 that is configured to generate deformation feedback, in accordance with some embodiments. FIG. 9A illustrates that the touch sensitive device 900 includes a plurality of electroactive substrates 950*a-b* that are included at opposing lateral surfaces of the housing 910. Each electroactive substrate 950*a*, 950*b* can be positioned to face a shaft 914. The shaft 914 is coupled to a distal tip 912 that is configured to contact with a touch screen panel 172 of the electronic device 170. In addition, FIGS. 9A-9B illustrate electrodes 940*a-b* that are positioned along the lateral surfaces of the housing 910 and are adjacent to the electroactive substrates 950*a-b*. For example, the electrode 940*a* is positioned adjacent to the electroactive substrate 950*a*, while the electrode 940*b* is positioned adjacent to the electroactive substrate 950*b*. In this manner, the electrode 940*a* can cause the electroactive substrate 950*a* to be modified, while the electrode 940*b* can cause the electroactive substrate 950*b* to be modified.

An amount of force (F) is directed towards the distal tip 912 from the touch screen panel 172, and an amount of load (L) is provided in a direction of a load path from the touch sensitive device 900 towards the touch screen panel 172. In some examples the amount of load (L) can be associated with an angle of touch down, as described in further detail with reference to FIGS. 22A-22C.

In conjunction with the amount of force or load that is detected by a sensor 260, the controller 210 can be configured to transmit at least one deformation feedback parameter to a power supply 230 to cause the power supply 230 to provide an input voltage to the electrodes 940*a-b*. Each electrode of the plurality of electrodes 940*a-b* can be individually actuated. In some examples, actuation of the electrode 940*a* can cause the electroactive substrate 950*a* to contract, while concurrent actuation of the electrode 940*b* can cause the electroactive substrate 950*b* to expand. The expansion of the electroactive substrate 950*b* can cause the electroactive substrate 950*b* to push against the lateral edges of the shaft 914 such that the shaft 914 bends in a substantially curvilinear fashion away from the electroactive substrate 950*b* and to bend towards the electroactive substrate 950*a*. Bending the shaft 914 in a substantially curvilinear fashion can cause the distal tip 912 to bend relative to the housing 910. In this configuration, the user can physically perceive a change in the amount of strain or stiffness in the housing 910. As shown in FIG. 9B, the electrodes 940*a-b* can cause the electroactive substrate 950*a-b* to bend in a direction that corresponds to the direction of the force (F) applied by the touch screen panel 172 and the direction of the load (L) characterized by the load path.

In some embodiments, the electroactive substrates 950*a-b* can be substituted with piezoelectric elements.

Figure 10A:
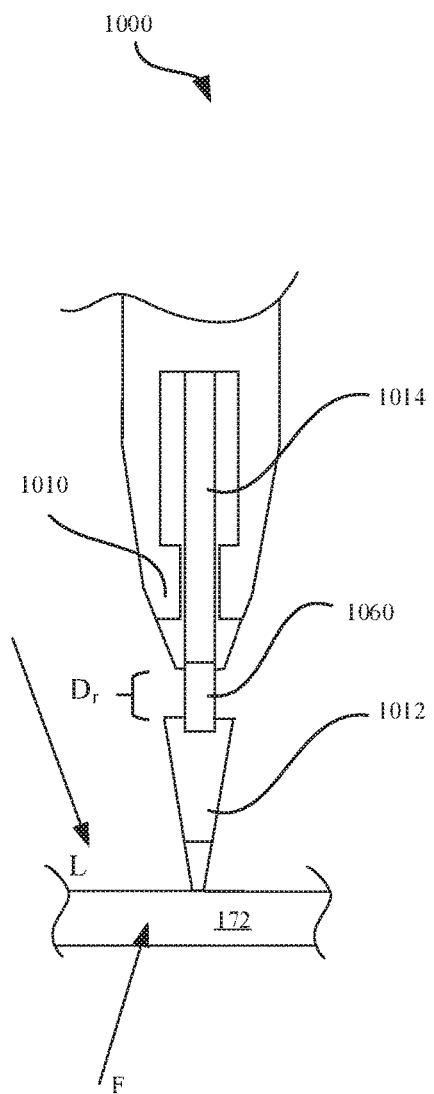
FIGS. 10A-10B illustrate cross-sectional views of a touch sensitive device for generating deformation feedback, in accordance with some embodiments.
Figure 10B:
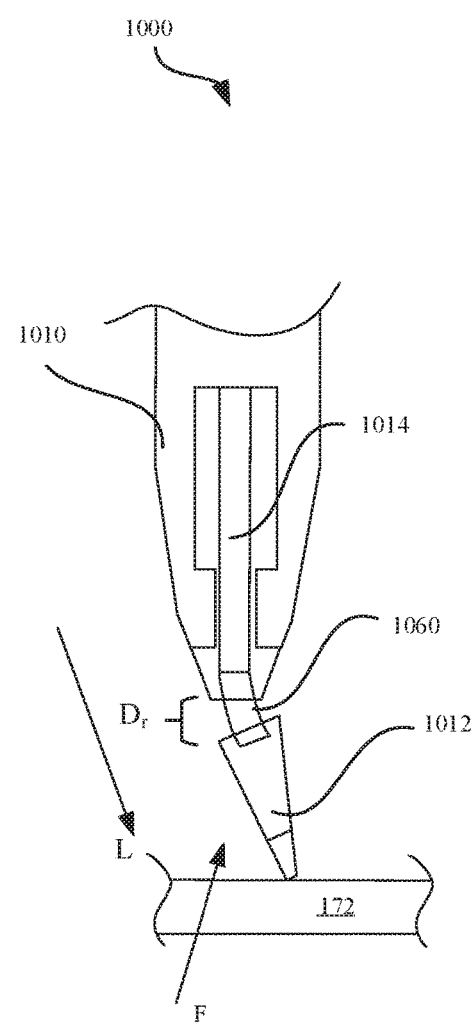

FIGS. 10A-B illustrate cross-sectional views of a touch sensitive device 1000 that is configured to generate deformation feedback, in accordance with some embodiments. FIG. 10A illustrates the flexible shaft member 1060 in an initial configuration. FIG. 10A illustrates a touch sensitive device 1000 having a flexible shaft member 1060 that is coupled to a shaft 1014 and a distal tip 1012. The touch sensitive device 1000 can include a housing 1010 that encloses the shaft 1014 and at least a portion (or substantially all of) the flexible shaft member 1060.

An amount of force (F) is directed towards the distal tip 1012 from the touch screen panel 172. Additionally, an amount of load (L) is provided in a direction of a load path from the touch sensitive device 1000 towards the touch screen panel 172. In some examples the amount of load (L) can be associated with an angle of touch down, as described in further detail with reference to FIGS. 22A-22C.

As shown in FIG. 10B, in conjunction with the distal tip 1012 contacting the touch screen panel 172 of the electronic device 170, the flexible shaft member 1060 can be configured to flex in a direction that corresponds to the direction of the amount of load (L) and the amount of force (F).

As shown in FIG. 10B, the flexible shaft member 1060 defines an amount of space ($D_r$) between the housing 1010 and the distal tip 1012. The amount of space ($D_r$) can define a range by which the flexible shaft member 1060 is configured to move relative to the housing 1010 and the distal tip 1012. In some examples, an increase in the amount of space ($D_r$) between the housing 1010 and the distal tip 1012 can facilitate the flexible shaft member 1060 to flex in a broader angle range, while a decrease in the amount of space ($D_r$) between the housing 1010 and the distal tip 1012 can reduce the angle range by which the flexible shaft member 1060 is configured to flex.

In some examples, the flexible shaft member 1060 can be comprised of a shape memory metal or metal alloy, such as copper-aluminum-nickel, iron-manganese-silicon, copper-zinc-aluminum, copper-aluminum-nickel, and nickel-titanium (NiTi) alloys. In some examples, the flexible shaft member 1060 can be comprised of zinc, copper, gold, or iron. In some embodiments, the flexible shaft member 1060 can exhibit super elasticity characteristics. In response to an amount of mechanical strain that is against the distal tip 1012 or the housing 1010, the flexible shaft member 1060 can bend from an initial configuration to a modified configuration. Once the load that is exerted against the distal tip 1012 is removed, the flexible shaft member 1060 can return to its initial configuration. In some examples, the flexible shaft member 1060 can be comprised of rubber or synthetic polymer, such as an elastomer having a low Young's modulus value. Since the flexible shaft member 1060 can be made of a flexible material that can be configured to passively (i.e., non-electrically) generate deformation feedback in accordance with the amount of load that is applied against the touch sensitive device 1000, the touch sensitive device 1000 does not require an electroactive substrate, piezoelectric element, or other material that requires an amount of input voltage to actively generate deformation feedback.

Figure 11A:
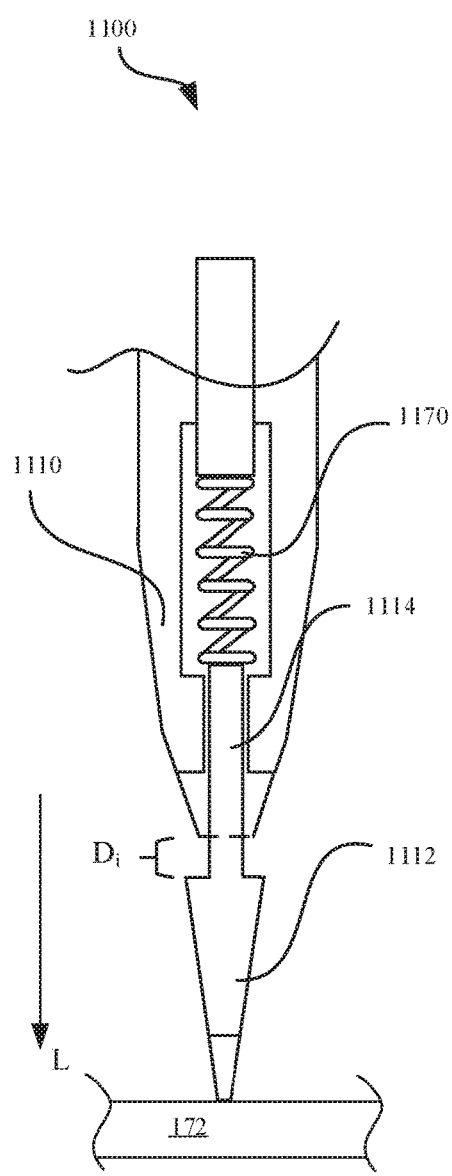
FIGS. 11A-11B illustrate cross-sectional views of a touch sensitive device for generating deformation feedback, in accordance with some embodiments.
Figure 11B:
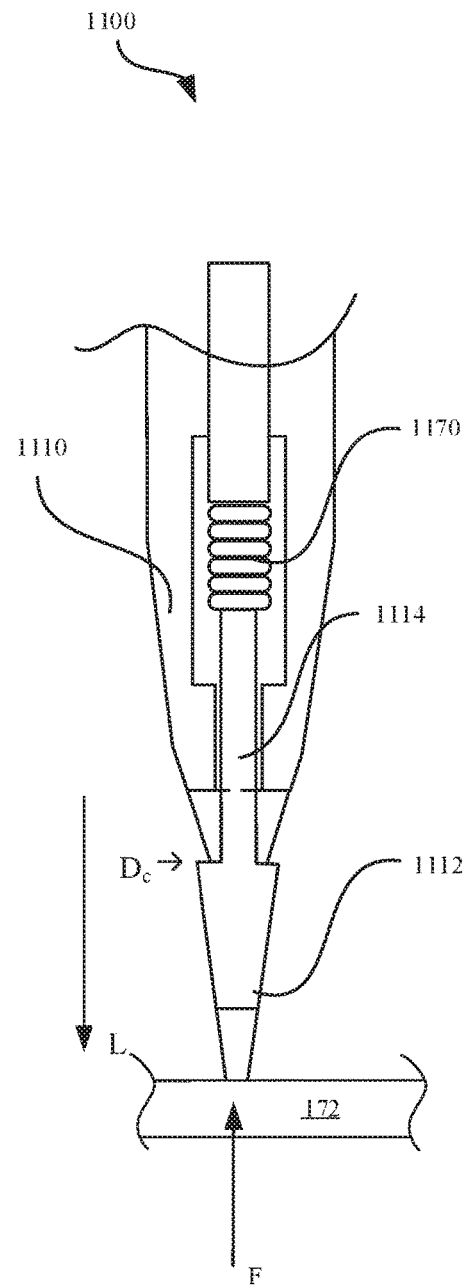

FIGS. 11A-11B illustrate cross-sectional views of a touch sensitive device 1100 that can be configured to generate deformation feedback, in accordance with some embodiments. FIG. 11A illustrates a touch sensitive device 1100 that includes a housing 1110 having an interior cavity 1108. Carried within the interior cavity 1108 is a shaft 1114 having a first end that is coupled to a distal tip 1112, while a second end of the shaft 1114 is coupled to a spring element 1170. FIG. 11A shows that the distal tip 1112 can come into contact with a touch screen panel 172 of the electronic device 170. In conjunction with the contact, an amount of force (F) can be exerted against the distal tip 1112, and an amount of load (L) is provided in a direction of a load path from the touch sensitive device 1100 towards the touch screen panel 172. In some examples the amount of load (L) can be associated with an angle of touch down, as described in further detail with reference to FIGS. 22A-22C.

In some embodiments, the distal tip 1112 can be separated from the housing 1110 by an initial compression distance ($D_i$). The initial compression distance ($D_i$) can refer to an amount by which the distal tip 1112 is configured to compress relative to the housing 1110 in conjunction with the force (F) and load (L) that is exerted against the distal tip 1112. Additionally, FIG. 11A illustrates the touch sensitive device 1100 in an initial configuration.

FIG. 11B illustrates the touch sensitive device 1100 in a modified configuration. As shown in FIG. 11B, the contact between the touch sensitive device 1100 and the touch screen panel 172 can cause the distal tip 1112 to protrude into the interior cavity 1108 so as to cause the spring element 1170 to compress according to the initial compression distance ($D_i$). The amount by which the spring element 1170 compresses can depend upon a number of factors including a length of the shaft 1114, the stiffness of the spring element 1170, the total possible deformation of the spring element 1170, and the spring factor constant of the spring element 1170. Accordingly, the amount by which spring element 1170 is compressed ($D_c$) can determine the amount of deformation feedback that is perceived by the user.

FIGS. 12A-12D illustrate cross-sectional views of various embodiments of a touch sensitive device 1200 that is configured to generate deformation feedback. FIG. 12A illustrates a touch sensitive device 1200 having an electroactive substrate 1250 that is included along a portion of a length of the housing 1210 of the touch sensitive device 1200. The electroactive substrate 1250 can be positioned in a grip region 1290 of the housing 1210 where a user's appendage might commonly grip or comfortably grip the touch sensitive device 1200. Although in some examples, the electroactive substrate 1250 can be positioned at other regions of the housing 1210 that would facilitate in providing user feedback. The electroactive substrate 1250 can be configured to provide deformation feedback to the user's appendage in conjunction with the touch sensitive device 1200 being in contact with a touch screen panel 172 of an electronic device 170.

In some embodiments, the electroactive substrate 1250 can be configured to provide sensing capabilities. In some examples, as the user's appendage grips against the electroactive substrate 1250, one or more sensors 260 positioned adjacent to the electroactive substrate 1250 can determine a change in voltage difference (e.g., capacitance) as a result of the mechanical strain applied against the electroactive substrate 1250. In some configurations, the controller 210 can be configured to determine a position of the user's appendage relative to the housing 1210 of the touch sensitive device 1200. For example, the controller 210 can be configured to determine that the user's appendage is currently gripping the electroactive substrate 1250 at the grip region 1290. Subsequently, the controller 210 can cause an input voltage to be selectively applied to the electroactive substrate 1250 included in the grip region 1290 via one or more electrodes 1240 that are positioned adjacent to the electroactive substrate 1250 to cause the electroactive substrate 1250 to deform or change in configuration to provide deformation feedback to the user, as shown in FIG. 12B.

In some embodiments, as shown in FIG. 12C, a plurality of electrodes 1240 can be positioned in a serial configuration along lateral sides of the electroactive substrate 1250. Each of the electrodes 1240 can be individually actuated such that the actuated electrode 1240 only affects a specific portion of the electroactive substrate 1250 that is positioned directly adjacent to the actuated electrode 1240. In this manner, the controller 210 can cause the electroactive substrate 1250 to provide targeted deformation feedback to only the portion of the electroactive substrate 1250 that is subject to mechanical strain from the user's appendage, while avoiding other portions of the electroactive substrate 1250 that are not being subjected to mechanical strain. In this configuration, the controller 210 can be configured to reduce or minimize power consumption by the power supply 230. Additionally, the controller 210 can be configured to prevent or minimize feedback confusion, such as by preventing portions of the electroactive substrate 1250 that are not being mechanically exerted against from generating deformation feedback.

In some embodiments, as shown in FIG. 12D, the touch sensitive device 1200 can include a plurality of electroactive substrates 1250 that are arranged in a serial configuration along the length of the housing 1210. In this manner, each electroactive substrate 1250 can be configured to provide targeted deformation feedback to only the portion of the electroactive substrate 1250 that is subject to mechanical strain from the user's appendage.

In some embodiments, the plurality of electroactive substrates 1250 can substantially conform to the appearance of the housing 1210 of the touch sensitive device 1200. For example, the plurality of electroactive substrates 1250 and the housing 1210 can share at least one of a similar color, texture, or reflective finish such that the plurality of electroactive substrate 1250 conform to a general appearance of the housing 1210. Additionally, techniques for providing a similar appearance can be applied to the embodiments of the touch sensitive device as described herein.

Figure 13B:
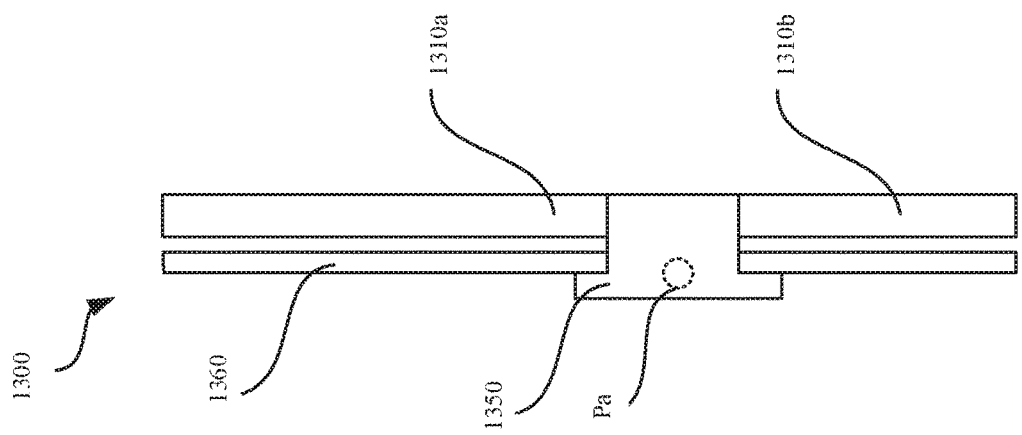
FIGS. 13A-13B illustrate cross-sectional views of a touch sensitive device for generating deformation feedback, in accordance with some embodiments.
Figure 13A:
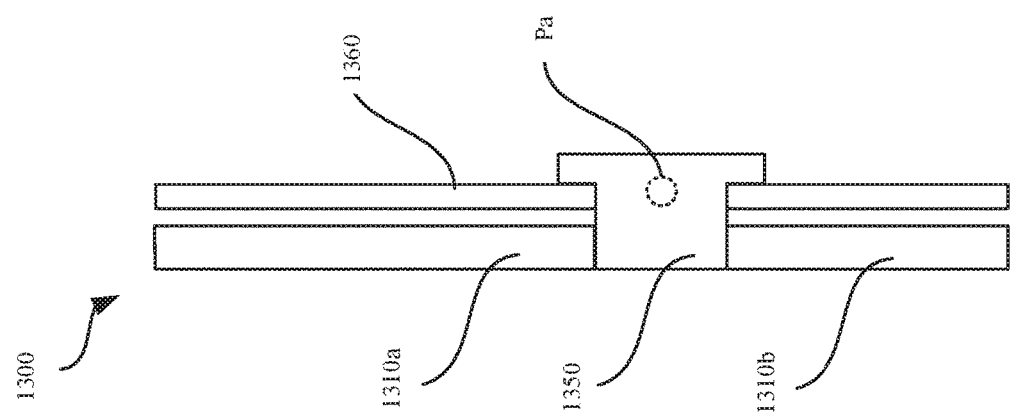

FIGS. 13A-13B illustrate cross-sectional views of a touch sensitive device 1300 having an electroactive substrate 1350 that is configured to generate deformation feedback, in accordance with some embodiments. FIGS. 13A-13B illustrates that the electroactive substrate 1350 can extend along a portion of the longitudinal length of the housing 1310a-b. Although not shown in FIGS. 13A-13B, a plurality of electrodes are positioned adjacent to each lateral surface of the electroactive substrate 1350.

As shown in FIG. 13A, the electroactive substrate 1350 can be configured to cover at least one of a portion of an upper portion 1310a or the lower portion 1310b of the housing. In addition, the electroactive substrate 1350 can cover a guide tube 1360. In some examples, the electroactive substrate 1350 can be molded with the upper and lower portions of the housing 1310a-b, and then subsequently fitted into the guide tube 1360.

The electroactive substrate 1350 can be configured to deform when subjected to an input voltage provided by the plurality of electrodes so that the upper portion 1310a of the housing bends or flexes relative to the lower portion 1310b of the housing at a pivot axis (Pa). The pivot axis (Pa) can dictate a bend angle and radius of the electroactive substrate 1350. Since the electroactive substrate 1350 is included external to the housing 1310a-b, the touch sensitive device 1300 can sacrifice a reduction in structural rigidity for an increased amount of bend or flex between the upper portion 1310a and the lower portion 1310b of the housing as compared to a touch sensitive device having an electroactive substrate 1350 that is included within an internal cavity of the housing 1310a-b.

In conjunction with transforming the electroactive substrate 1350 from an initial configuration to a modified configuration, the electroactive substrate 1350 can expand or contract in an axial direction that causes the electroactive substrate 1350 to induce strain against the upper portion 1310a and lower portion 1310b of the housing.

FIG. 13A illustrates where the pivot axis (Pa) is positioned along a right side of the touch sensitive device 1300, while FIG. 13B illustrates where the pivot axis (Pa) is positioned along a left side of the touch sensitive device 1300. In this manner, FIGS. 13A-13B illustrate that the electroactive substrate 1350 can bend or flex in an asymmetrical manner in conjunction with an amount of force or load that is exerted on the touch sensitive device 1300. For example, in reference to FIG. 13B, if a user's appendage presses against the lateral side of the electroactive substrate 1350 that opposes the pivot axis (Pa), the electroactive substrate 1350 can bend such that the ends of the upper and lower portions 1310a-b of the housing bend in a direction corresponding to the point of contact such that a greater amount of deformation feedback is felt at the right side of the touch sensitive device 1300 than the left side.

FIGS. 14A-14B illustrate cross-sectional views of a touch sensitive device 1400 having an electroactive substrate 1450 that is configured to generate deformation feedback, in accordance with some embodiments. FIGS. 14A-14B illustrate that the electroactive substrate 1450 is positioned along a portion of a longitudinal length of the upper and lower portions of the housing 1410a-b of the touch sensitive device 1400.

In contrast to the touch sensitive device 1300 shown in FIGS. 13A-13B, the electroactive substrate 1450 does not overlap the guide tube 1460. Instead the electroactive substrate 1450 is limited to covering the upper and lower portions of the housing 1410a-b. The electroactive substrate 1450 is supported by the guide tube 1460 to facilitate in providing rigidity to the touch sensitive device 1400, while sacrificing a degree of flexibility. In some embodiments, the guide tube 1460 is characterized as being an overlap guide tube structure. The guide tube 1460 includes an overlap 1464 having a recess 1462 that is configured to receive a portion of the electroactive substrate 1450. For example, the recess 1462 includes an upper surface 1462a and a lower surface 1462b that define the compression travel (T) range by which the electroactive substrate 1450 is restricted to expand or contract. Accordingly, the electroactive substrate 1450 is unable to expand or contract beyond the boundaries established by the upper surface 1462a and the lower surface 1462b of the recess 1462. In some examples, expansion of the electroactive substrate 1450 against the upper and lower surfaces 1462a-b can induce strain against the housing 1410a-b that can be perceived by the user.

FIG. 14A illustrates where the recess 1462 is positioned along a right side of the guide tube 1460, while FIG. 14B illustrates where the recess 1462 is positioned along a left side of the guide tube 1460.

In some examples, the guide tube 1460 can be comprised of a metal alloy or metal, such as steel.

Figure 15B:
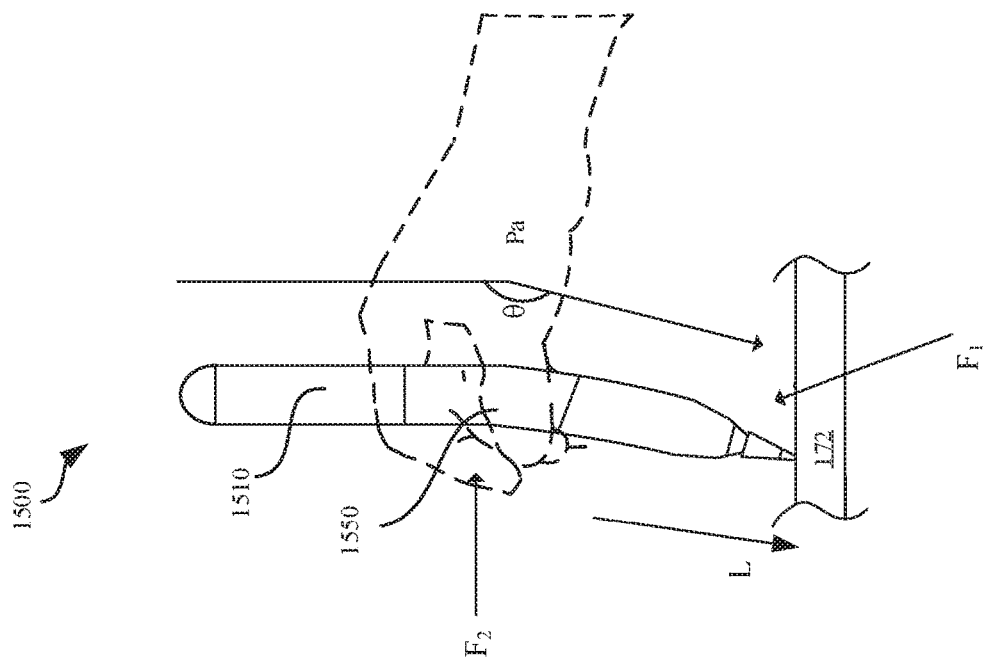
FIGS. 15A-15B illustrate perspective views of a touch sensitive device for generating deformation feedback, in accordance with some embodiments.
Figure 15A:
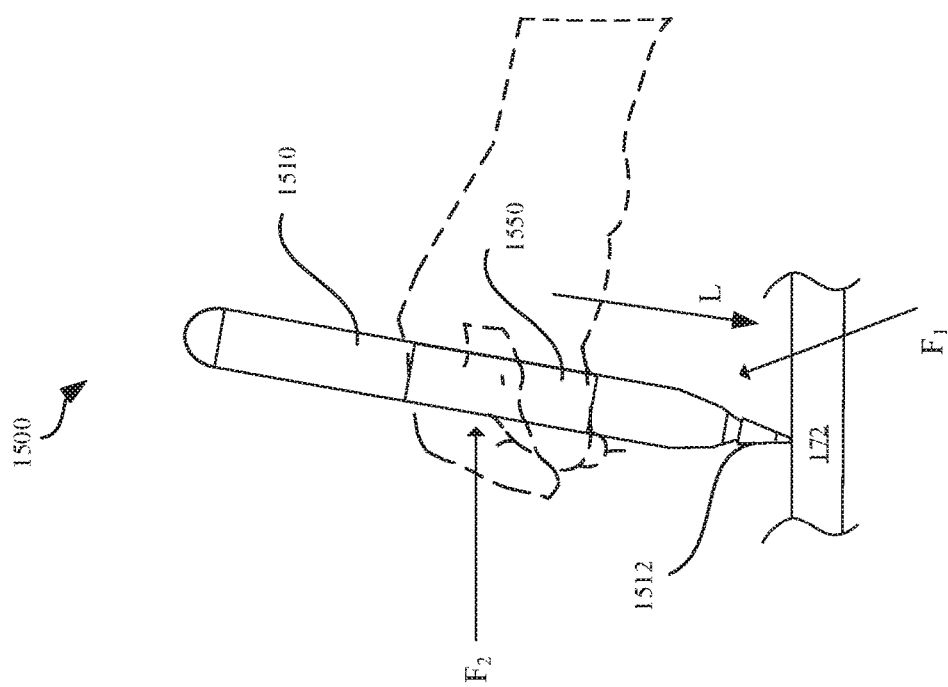

FIGS. 15A-15B illustrate perspective views of a touch sensitive device 1500 that can be configured to generate deformation feedback, in accordance with some embodiments. As shown in FIG. 15A, the touch sensitive device 1500 includes an electroactive substrate 1550 that extends along a portion of the longitudinal length of the housing 1510. The electroactive substrate 1550 can be configured to come into contact with the user's appendage, where an amount of mechanical strain or force ($F_2$) is applied by the user's appendage against the electroactive substrate 1550.

FIG. 15A further shows that a distal tip 1512 of the touch sensitive device 1500 is configured to come into contact with a touch screen panel 172 of an electronic device 170. An amount of load (L) is applied in a direction of a load path from the touch sensitive device 1500 towards the touch screen panel 172. In addition, an amount of force ($F_1$) is applied by the touch screen panel 172 towards the touch sensitive device 1500. In some examples the amount of load (L) can be associated with an angle of touch down, as described in further detail with reference to FIGS. 22A-22C. FIG. 15A shows that the electroactive substrate 1550 of the touch sensitive device 1500 can be configured to detect multiple types of force ($F_1$, $F_2$) as well as load (L) and provide deformation feedback accordingly as shown in FIG. 15B.

FIG. 15B shows that the electroactive substrate 1550 is configured to flex or bend relative to a pivot axis (Pa) having an angle (θ). The electroactive substrate 1550 can be configured to expand or contract against the housing 1510 so as to induce an amount of strain in the housing 1510 that can be perceived by the user.

As shown in FIG. 15B, the electroactive substrate 1550 is configured to bend in a direction that corresponds to the direction of the force ($F_1$) applied by the touch screen panel 172, the direction of the force ($F_2$) applied by the user's appendage, and the direction of the load (L) characterized by the load path.

Figure 16:
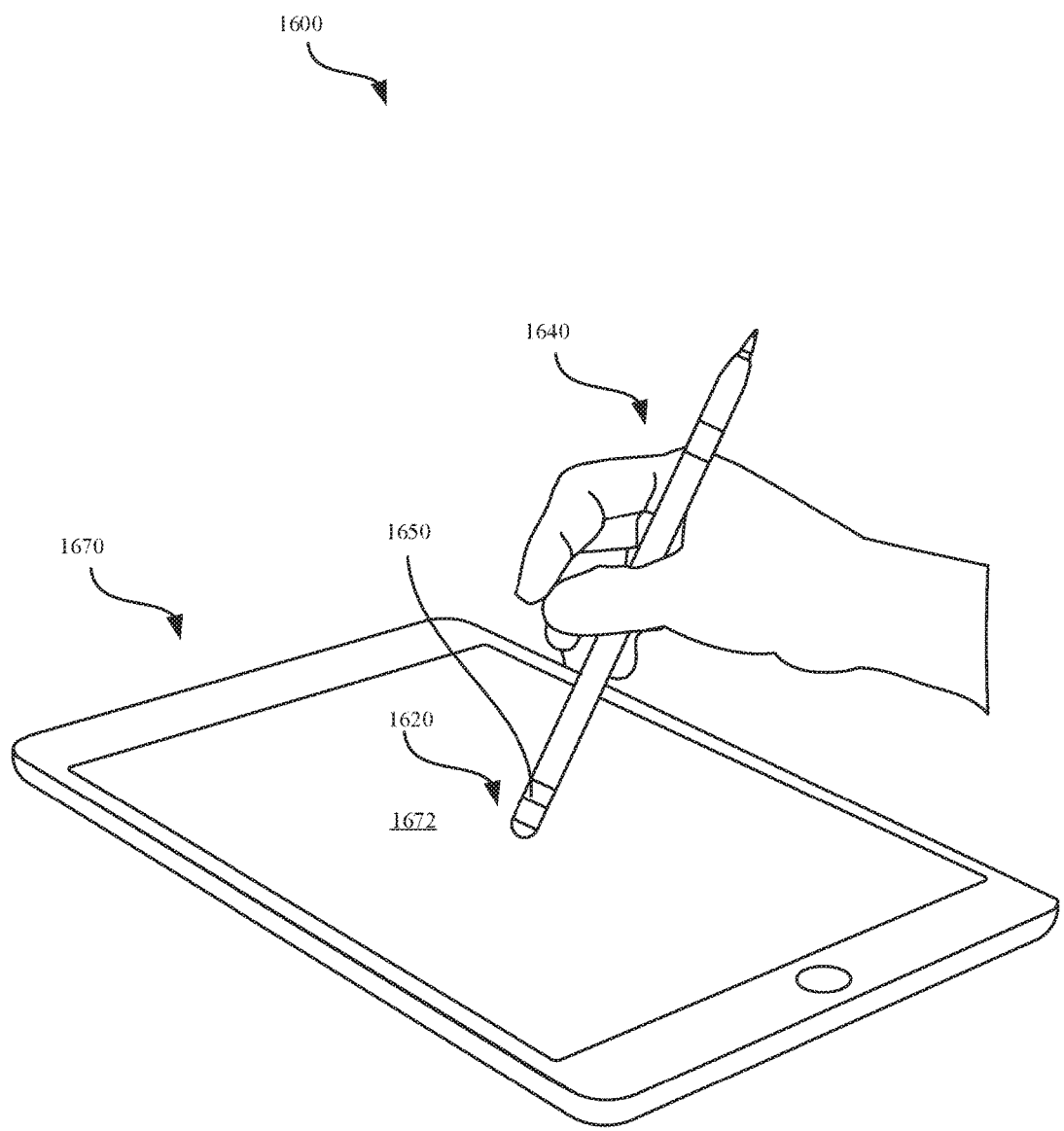
FIG. 16 illustrates a perspective view of a system for generating deformation feedback, in accordance with some embodiments.
Figure 17:
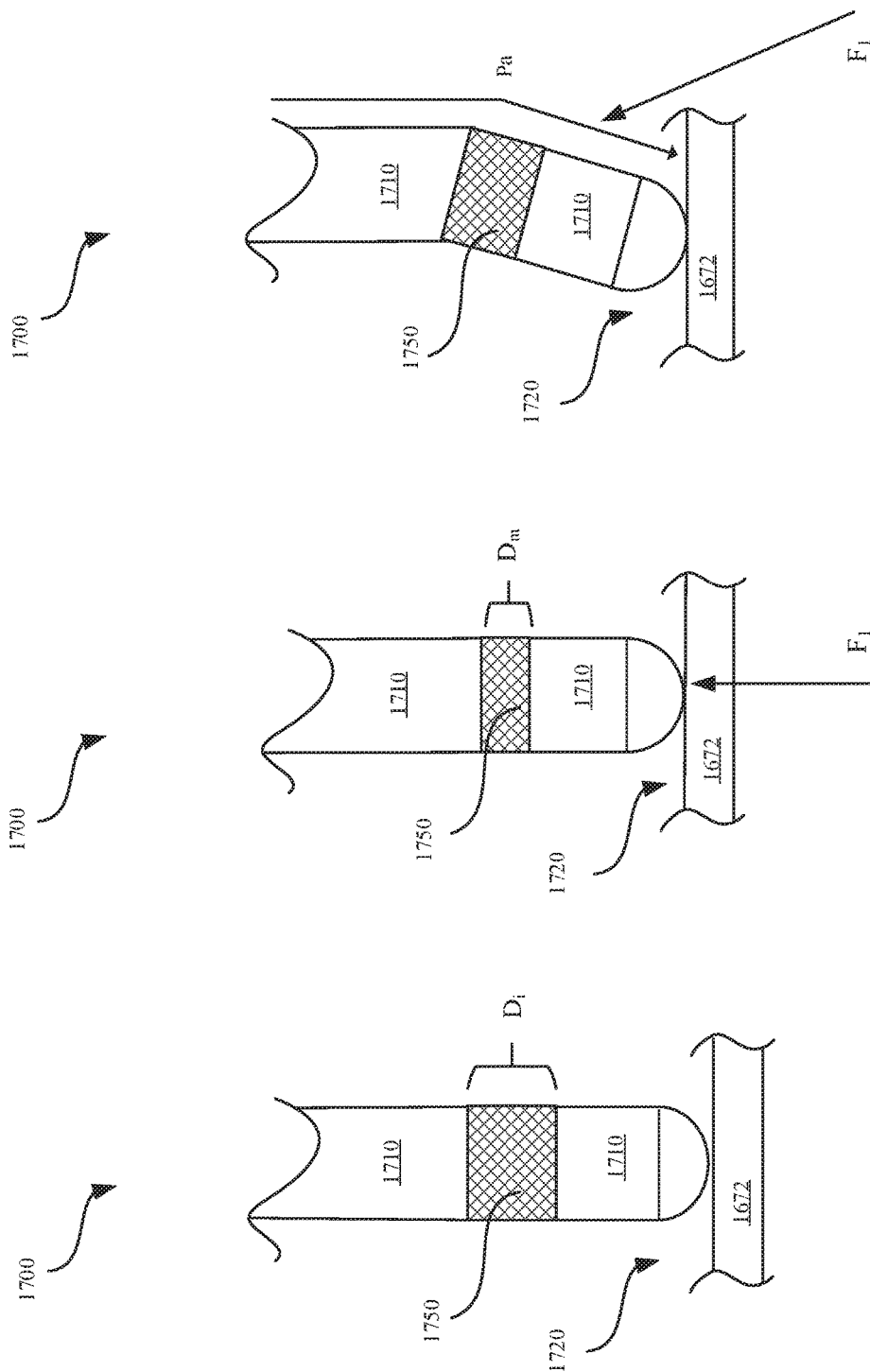
FIGS. 17A-17C illustrate cross-sectional views of a touch sensitive device for generating deformation feedback, in accordance with some embodiments.
Figure 18:
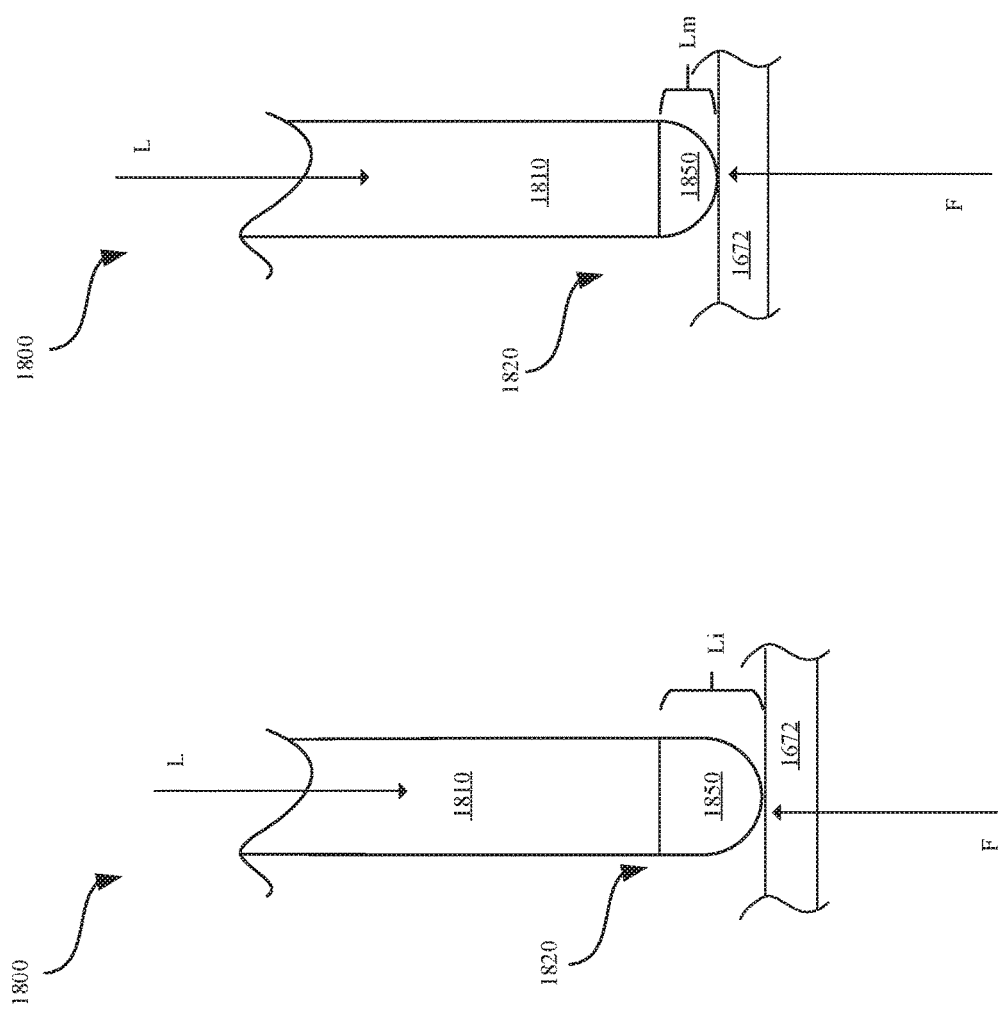
FIGS. 18A-18B illustrate cross-sectional views of a touch sensitive device for generating deformation feedback, in accordance with some embodiments.

FIG. 16 illustrates a perspective view of a system 1600 for generating deformation feedback by a touch sensitive device 1640, in accordance with some embodiments. FIG. 16 shows an electroactive substrate 1650 that is positioned near a proximal end 1620 of the touch sensitive device 1640. In conjunction with contact between the touch sensitive device 1640 and a surface, such as a touch screen panel 1672 of the electronic device 1670, the touch sensitive device 1640 can be configured to generate deformation feedback. In some examples, the electroactive substrate 1650 can be configured to deform (e.g., contract) to simulate the perception that the electroactive substrate 1650 is an eraser or rubbing compound when the touch sensitive device 1640 is used in coordination with a media application 1920 (see FIG. 19) that is executed by the electronic device 1670, as described in greater detail with reference to FIGS. 18-19. For example, using the media application 1920, when a media tool type of an "eraser" is selected, the electronic device 1670 can be configured to transmit instructions to the touch sensitive device 1640 to cause the touch sensitive device 1640 to deform the electroactive substrate 1650 to replicate the physical perception of using an eraser to remove media content on the touch screen panel 1672. For example, the instructions provided to the touch sensitive device 1640 can cause electrodes within the touch sensitive device 1640 to provide an input voltage to the electroactive substrate 1650.

In some embodiments, simply abrading the electroactive substrate 1650 against the touch screen panel 1672 can trigger the sensor 260 and the controller 210 of the touch sensitive device 1640 to determine that the user intends to simulate an erasing function. For example, the media application 1920 can be configured to digitally erase drawn lines that are displayed by the touch screen panel 1672 when the electroactive substrate 1650 is abraded in contact with the touch screen panel 1672. As a result, the electroactive substrate 1650 can be configured to transform from an initial configuration to a modified configuration. Moreover, the electroactive substrate 1650 can be configured to further or progressively contract in area or size as the erasing function is performed over time to simulate the effect of removing a greater amount of the erasing compound. Additionally, the electroactive substrate 1650 can vary in the amount of contraction to provide additional feedback, such as to distinguish between vigorous erasing and light erasing. The variation in the amount of contraction by the electroactive substrate 1650 can be controlled by the controller 210, and can be further implemented by adjusting the amount of input voltage that is provided by the electrodes 270 to the electroactive substrate 1650.

FIGS. 17A-17C illustrate cross-sectional views of a touch sensitive device 1700 that includes an electroactive substrate 1750 that is configured to generate deformation feedback, in accordance with some embodiments.

As shown in FIGS. 17A-17C, the electroactive substrate 1750 is positioned within a housing 1710 and distal from a proximal end 1720 of the touch sensitive device 1700. In conjunction with an amount of force (F) that is applied by the touch screen panel 1672 to the touch sensitive device 1700 and an amount of load (L) that is applied against the touch screen panel 1672 by the touch sensitive device 1700, the electroactive substrate 1750 can be modified from an initial distance ($D_i$) to a modified distance ($D_m$), as shown in FIG. 17B. In some examples the amount of load (L) can be associated with an angle of touch down, as described in further detail with reference to FIGS. 22A-22C.

FIG. 17C shows a touch sensitive device 1700 having an electroactive substrate 1750 that is subjected to force (F) from the touch screen panel 1672 and load (L) that is applied against the touch screen panel 1672 in an angular direction. The electroactive substrate 1750 can define a pivoting axis (Pa) that defines a range by which the electroactive substrate 1750 is configured to bend. As shown in FIG. 17C, the electroactive substrate 1750 can be configured to bend in a direction that corresponds to the angular direction of the force (F) and the load that is applied (L).

FIGS. 18A-18B illustrate a cross-sectional view of a touch sensitive device 1800 that is configured to generate deformation feedback, in accordance with some embodiments. FIG. 18A shows that the touch sensitive device 1800 includes an electroactive substrate 1850 at a proximal end 1820 of the touch sensitive device 1800. The electroactive substrate 1850 is shown in contact with a touch screen panel 1672 of the electronic device 1670. An amount of load (L) is exerted against the touch screen panel 1672 by the touch sensitive device 1800, while an amount of force (F) is applied by the touch screen panel 1672 against the electroactive substrate 1850.

In some embodiments, the electroactive substrate 1850 can be configured to provide both sensing and deformation feedback capabilities.

As shown in FIG. 18A, the electroactive substrate 1850 can be characterized as having an initial length ($L_i$) when the electroactive substrate 1850 is not actuated. FIG. 18B shows that the electroactive substrate 1850 contracts to a modified length ($L_m$). In conjunction with actuation of one or more electrodes (not illustrated), the electroactive substrate 1850 can be configured to expand or contract such that an amount of strain can be induced against the housing 1810.

Figure 19:
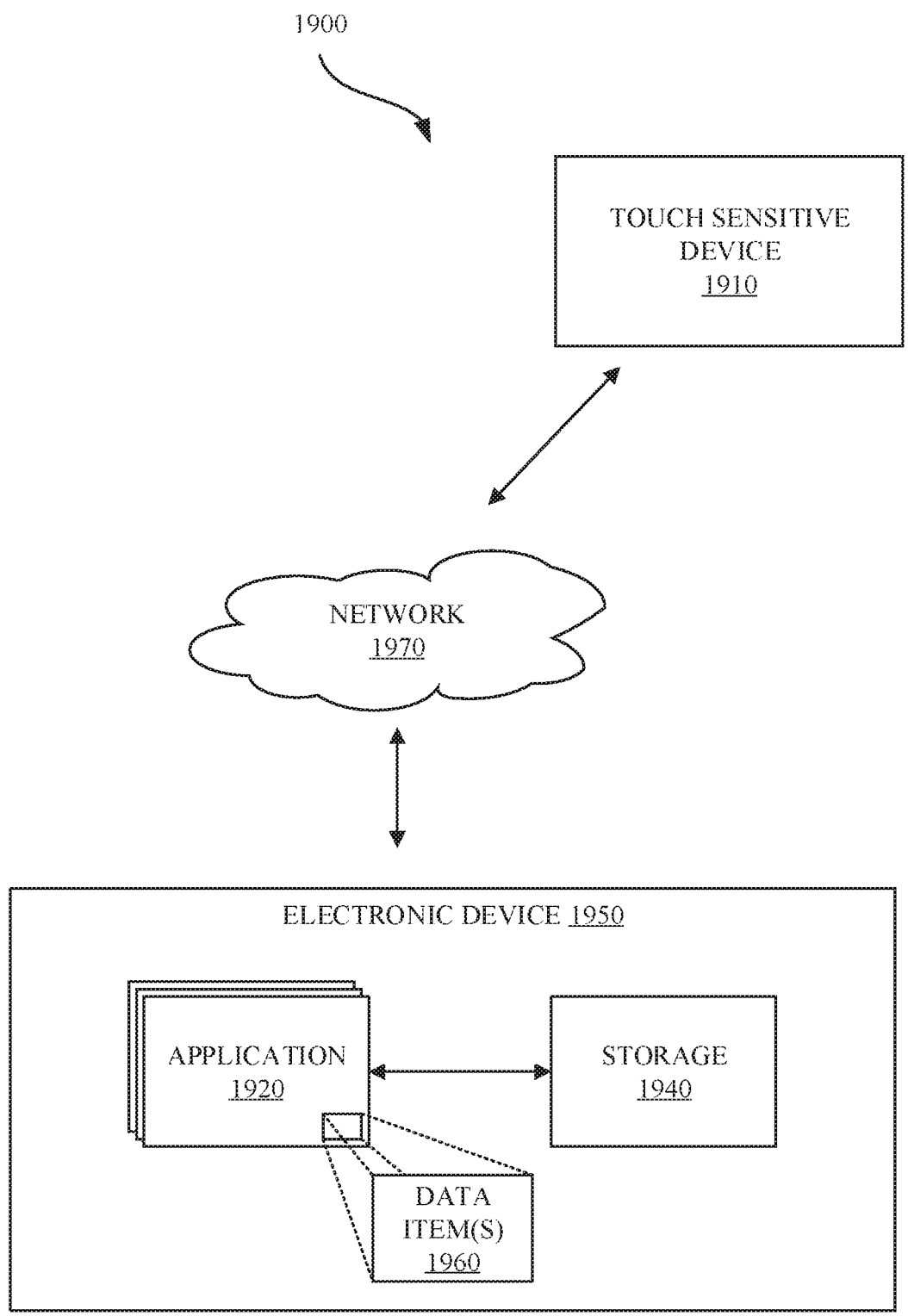
FIG. 19 illustrates a block diagram of different components of a system that is configured to provide deformation feedback, in accordance with some embodiments.

FIG. 19 illustrates a block diagram of different components of a system 1900 that is configured to implement the various techniques described herein, such as generating deformation feedback, according to some embodiments. More specifically, FIG. 19 illustrates a high-level overview of the system 1900, which includes an electronic device 1950 that can represent, for example, a portable computer, a tablet, a smartphone, or other electronic device with a touch screen display. According to some embodiments, the electronic device 1950 can be configured to execute (e.g., via an operating system established on the electronic device 1950) a media application 1920. In one example, the media application 1920 can represent a graphic presentation program, such as Apple Keynote, produced by Apple Inc. In other examples, the application 1920 can represent a multimedia program, an illustrator program, a music player, a word editing program, a photography editing program, a web development program, and the like. As shown in FIG. 19, the application 1920 and a storage device 1940 of the electronic device 1950 can be configured to directly communicate with one another. In some embodiments, the storage device 1940 can include a data item 1960 managed by the application 1920. The application 1920 can request the data item 1960 from the storage device 1940. In one example, the data item 1960 refers to a feedback preference that can be selected by the user to be used in conjunction with the media application 1920, as described in more detail with reference to FIG. 20. In another example, the data item 1960 can refer to a document or image that is to be executed by the application 1920.

As described in greater detail herein, the application 1920 can be configured to execute a graphics presentation program. In some embodiments, the application 1920 is configured to receive a graphical input during contact between the touch sensitive device 1910 and the electronic device 1950. For example, the application 1920 can receive a graphical input in conjunction with the electronic device 1950 detecting a change in capacitance during the contact. According to some embodiments, the electronic device 1950 includes a touch screen panel 172 that includes capacitive sensors, where each capacitive sensor includes electrodes. The electrodes of the capacitive sensors are configured to detect the capacitive input provided by the touch sensitive device 1910 and process different contact parameters of the capacitive input, including the speed of the input, the force of the input, the position of the input, the acceleration of the input, the angle of the input relative to the touch screen panel, and the like. The processor of the electronic device 1950 can process the different contact parameters detected by the capacitive sensors in order to generate a deformation feedback parameter. In some embodiments, the application 1920 can be configured to receive a user selection of a feedback preference. Subsequently, the processor of the electronic device 1950 is configured to generate the deformation feedback parameter by combining an electrical signal associated with the different contact parameters with an electrical signal associated with the feedback preference, as described in greater detail with reference to FIGS. 21A-21B.

As shown in FIG. 19, the electronic device 1950 is configured to communicate with the touch sensitive device 1910 via a network 1970, where the network 1970 can represent at least one of a global network (e.g., the Internet), a wide area network, a local area network, a wireless personal area network (WPAN), and the like. In some examples, the network 1970 can represent a WPAN for transmitting data between the electronic device 1950 and the touch sensitive device 1910. The WPAN network can represent Bluetooth (IEEE 802.15.1), ZigBee, Wireless USB, and the like. In some examples, the network can refer to Near-Field Communication (NFC). According to some embodiments, the electronic device 1950 can be configured to provide instructions to the touch sensitive device 1910 to cause the touch sensitive device 1910 to generate deformation feedback.

Figure 20:
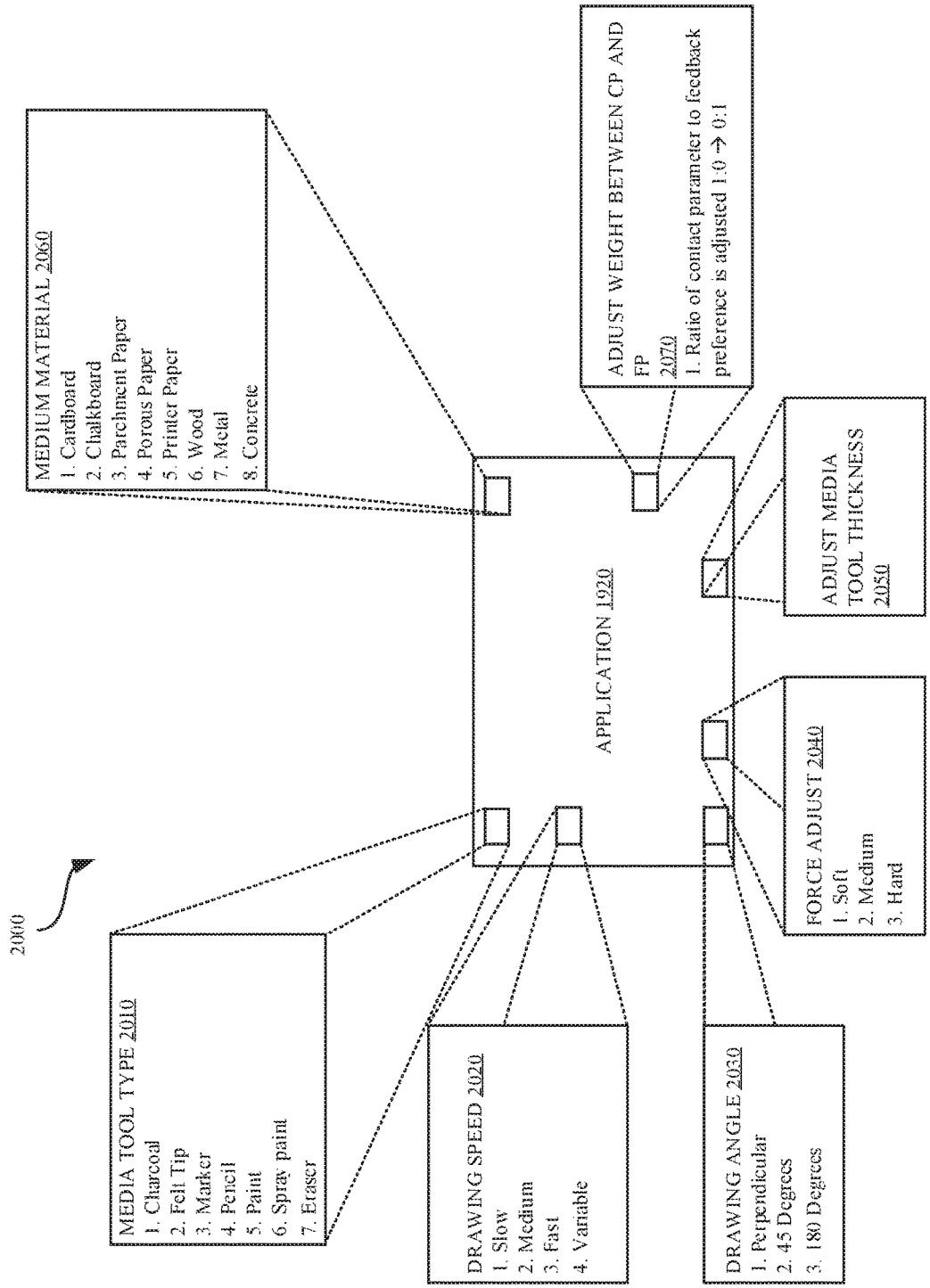
FIG. 20 illustrates a block diagram of an exemplary list of feedback preferences associated with an application for generating deformation feedback, in accordance with some embodiments.

FIG. 20 illustrates a system view of an exemplary list of feedback preferences associated with data items 1960 that can be executed by the application 1920. The feedback preferences can be selected by a user in conjunction with using the touch sensitive device 1910 generating deformation feedback. In some embodiments, the user can select one of several feedback preferences via the application 1920. As shown in FIG. 20, the exemplary list of feedback preferences includes: "Media Tool Type" 2010, "Drawing Speed" 2020, "Drawing Angle" 2030, "Force Adjust" 2040, "Adjust Media Tool Thickness" 2050, "Medium Material" 2060, and "Adjust Weight Between Contact Parameter and Feedback Preference" 2070. The processor is configured to generate an electrical signal associated with the feedback preference. In some embodiments, the electronic device 1950 can transmit the feedback preference to the touch sensitive device 1910. In some embodiments, the controller 210 of the touch sensitive device 1910 can combine an electrical signal associated with the feedback preference with an electrical signal associated with a contact parameter (generated by the touch sensitive device 1910) into a combined deformation feedback parameter, as described in more detail with reference to FIGS. 21A-21B.

In some embodiments, the application 1920 provides a graphical user interface (GUI) that permits for the user to select one or more feedback preferences. Each feedback preference can be associated with a list of one or more options, where each option is associated with a deformation feedback that can be paired with the contact parameter to generate a combined deformation feedback parameter. Alternatively, the touch sensitive device 1910 can be configured to generate deformation feedback without the feedback preferences.

In one example, the user can select "Drawing Speed" 2020, whereupon the application 1920 provides a list of options for causing the touch sensitive device 1910 to generate different deformation feedback corresponding to the drawing speed. For example, selection of the "Drawing Speed" can provide options for adjusting the amount of deformation feedback (e.g., strain, compression) that is generated by the deformation feedback component 150 when the drawing speed is selected from among: 1) slow; 2) medium; 3) fast; or 4) variable. In one example, where the contact parameter detected by the touch sensitive device 1910 is constant (e.g., change in capacitance), a selection of a fast drawing speed can cause a greater amount of compression to be generated by the deformation feedback component 150 than a selection of a slow drawing speed.

In one example, a user can select "Medium Material" 2060, whereupon the application 1920 provides a list of options for generating different types of deformation feedback associated with different medium materials. For example, selection of the "Medium Material" can provide options, including: 1) cardboard; 2) chalkboard; 3) parchment paper; 4) porous paper; 5) printer paper; 6) wood; 7) metal; and 8) concrete. In one example, where the contact parameter (e.g., capacitance) is constant, a selection of a metal medium material can cause the deformation feedback component 150 of the touch sensitive device 1910 to generate less strain than a selection of a wood medium material. Since wood can be associated with having a higher degree of coefficient of friction than metal, drawing on wood can cause more strain to be exerted against the touch sensitive device 1910.

In one example, the user can select "Media Tool Type" 2010, whereupon the application 1920 provides a list of options for generating different deformation feedback that correspond to various media tools. For example, selection of the "Media Tool Type" can provide options, including: 1) charcoal; 2) felt tip; 3) marker; 4) pencil; 5) paint; 6) spray paint; and 7) eraser. In one example, where the contact parameter (e.g., capacitance) is constant, a selection of an eraser media tool type can generate significantly more strain on the touch sensitive device 1910 compared to a selection of a marker media tool type. Since an eraser can be associated with having a higher degree of coefficient of friction than a marker, the eraser can cause more strain to be exerted against the touch sensitive device 1910.

In another example, the user can select "Force Adjust" 2040, whereupon the user is provided with a list of options, including: 1) soft; 2) medium; or 3) hard. Each force adjustment option is associated with a different type of deformation feedback. In some embodiments, the "Force Adjust" 2040 option can be performed in conjunction with the sensor 260 of the touch sensitive device 1910. For example, the sensor 260 can be configured to detect an amount of force that is applied against the touch screen panel 172. The sensor 260 can generate a contact parameter that indicates the amount of force applied can be transmitted by the touch sensitive device 1910 to the electronic device 1950, whereupon a processor of the electronic device 1950 can combine the feedback preference selected by the user with the contact parameter in order to generate a combined deformation feedback parameter. For example, if the force detected by the sensor 260 is strong, but the "soft" force adjustment is selected, then the electronic device 1950 can provide the touch sensitive device 1910 with instructions that cause the touch sensitive device 1910 to generate deformation feedback that is of a medium amount of force.

In some embodiments, the controller 210 of the touch sensitive device 1910 and the processor of the electronic device 1950 can be configured to combine the electrical signals associated with the feedback preference (FP) with the electrical signals associated with the contact parameter (CP). In some embodiments, the controller 1930 and processor 2430 can be configured to adjust the amount of weight for each set of electrical signals. In some embodiments, the application 1920 can provide the "Adjust Weight"

2070 feedback preference that can be selected to allow a user to adjust the ratio of the feedback preference (FP) to the contact parameter (CP). For example, a user may want to place more weight on the feedback preference by assigning the FP with a higher weighted value than the contact parameter. The ratio between FP and CP can have a ratio ranging between 1:0 to 0:1. In one example, the application 1920 can select a ratio 9:1 to assign more weight to the feedback preference than to the contact parameter. In another example, the application 1920 can adjust the ratio to 5:5 to assign an equal amount of weight to the feedback preference and the contact parameter.

In some embodiments, the processor of the electronic device 1950 can transmit the adjusted ratio to the controller 210 of the touch sensitive device 1910, so that the controller 210 performs the adjustment of the amount of weight assigned to the FP and to the CP.

In some examples, each of the feedback preferences shown in FIG. 20 can be stored in the storage device 1940 of the electronic device 1950. In some examples, the application 1920 can rely upon machine-learning algorithm to learn a user's preferences and adjust a default preference to align more similarly to the user's preference as learned over time so that the settings of each of the feedback preferences is adjusted to more closely conform to a user's preferences. In some examples, the application 1920 can be configured to store multiple user's preferences for later usage.

Figure 21:
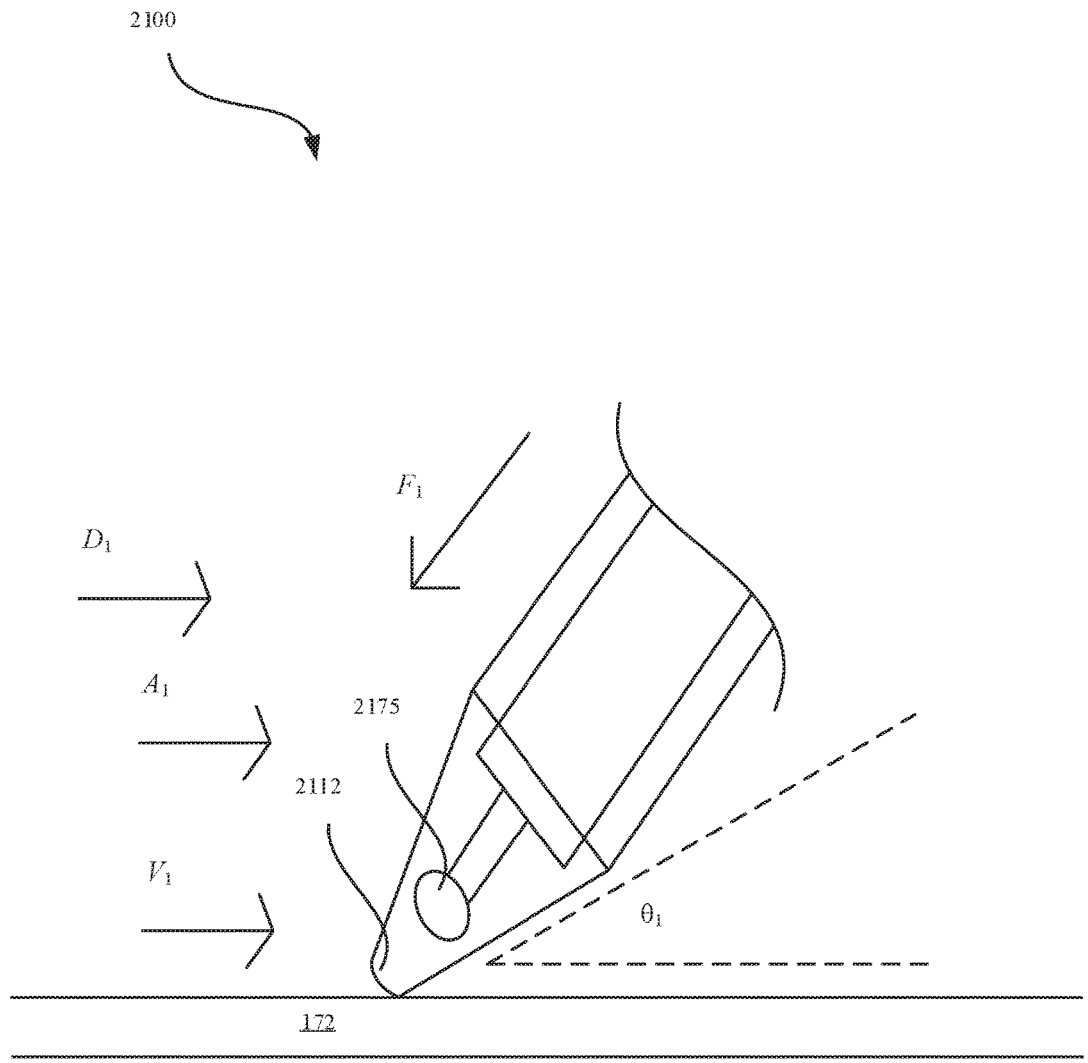
FIG. 21 illustrates exemplary contact parameters configured to be detected by a touch sensitive device, in accordance with some embodiments.

FIG. 21 illustrates an exemplary diagram of using a touch sensitive device 2100 in conjunction with the electronic device 170, in accordance with some embodiments. FIG. 21 illustrates that when the distal tip 2112 of the touch sensitive device 2100 makes contact with the touch screen panel 172 of the electronic device 170, a sensor 260 of the touch sensitive device 2100 can be configured to detect a change in capacitance. A contact parameter can be generated by the controller 210 based on the change in capacitance. For example, the contact parameter can refer to at least one of distance ($D_1$) traveled by the distal tip 2112, acceleration ($A_1$) of the distal tip 2112, velocity ($V_1$) of the distal tip 2112, force ($F_1$) applied by the distal tip 2112 against the touch screen panel 172, and an angle ($\theta_1$) between the distal tip 2112 and the touch screen panel 172. In some embodiments, the sensor 260 is a strain sensor and can be configured to measure a strain measurement in conjunction with the distal tip 2112 making contact with the touch screen panel 172.

FIG. 21 illustrates an exemplary diagram of the distal tip 2112 of the touch sensitive device 2100 making contact with the touch screen panel 172. In one example, in conjunction with the contact, the sensor 260 can be configured to determine a capacitive change in electrical current that corresponds to an amount of distance ($D_1$) traveled by the distal tip 2112 between a starting time ($t_0$) and current time ($t_1$), in accordance with one example. The sensor 260 can be configured to monitor an amount of distal traveled by the distal tip 2112 by tracking a change in a first position corresponding to $t_0$ and a second position corresponding to $t_1$.

In another example, the sensor 260 can be configured to determine an amount of force ($F_1$) that is exerted by the distal tip 2112 against the touch screen panel 172. In some embodiments, the touch sensitive device 2100 includes a conductive electrode 2175 included within the distal tip 2112 that can be configured to create an electrical pathway with the touch screen panel 172. The electrical pathway can be severed when the conductive electrode 2175 breaks contact from the touch screen panel 172.

In some embodiments, based upon the detected change in capacitance, the deformation feedback component 250 can be configured to generate deformation feedback that opposes the direction, distance, or force of the distal tip 2112 of the touch sensitive device 2100. In one example, the controller 210 can receive instructions from the electronic device 170 that can cause the controller 210 to exaggerate the amount of deformation feedback that is generated if the touch sensitive device 2100 is to simulate the perception of a heavy, wood paint brush in contrast to a light, plastic pencil. In this manner, the controller 210 can artificially increase the amount of strain that is generated by the deformation feedback component 250.

Figure 22B:
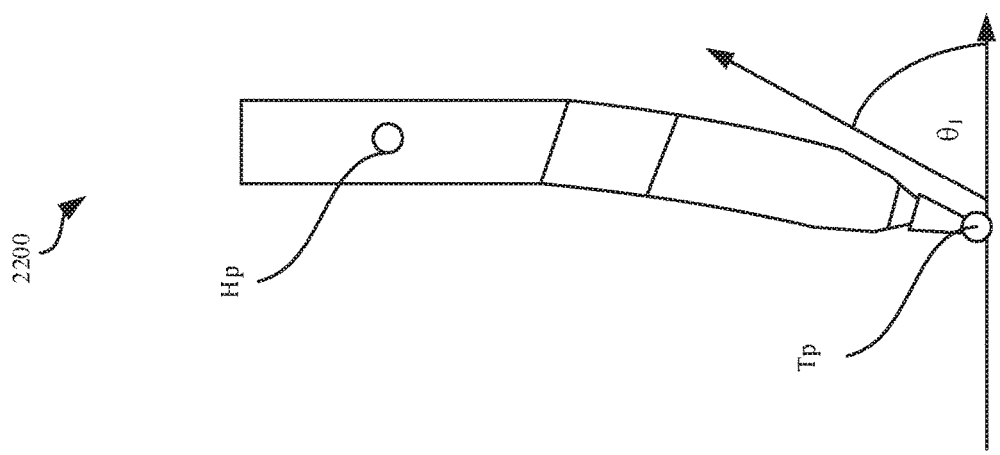
FIGS. 22A-22B illustrate perspective views of a touch sensitive device configured to generate a varying load path, in accordance with some embodiments.
Figure 22A:
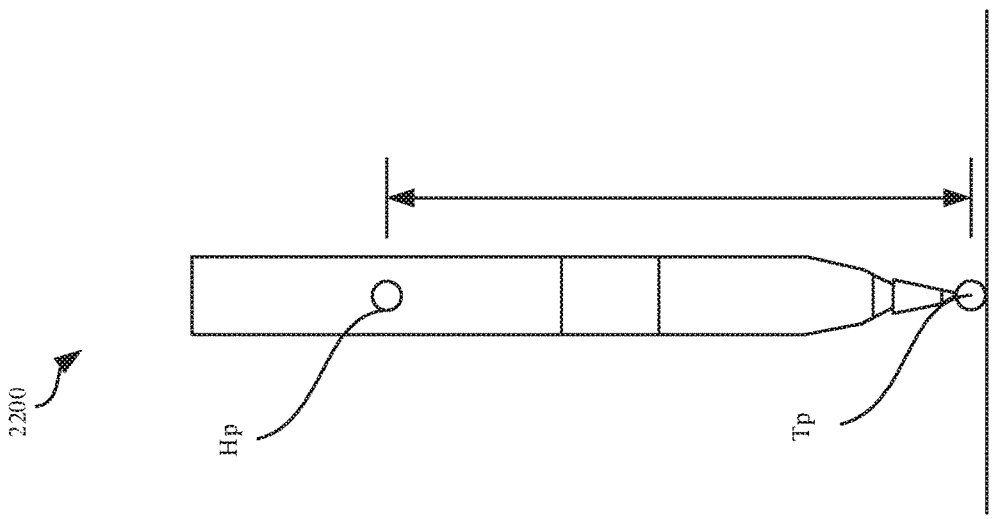

FIGS. 22A-22B illustrate the effect the electroactive substrate 2250 induces in the angle of touch down, in accordance with some embodiments. FIG. 22A illustrates a touch sensitive device 2200 having an electroactive substrate 2250 where a load path ($L_p$) is defined between a hand grip point ($H_p$) and a touch down point ($T_p$). Since the electroactive substrate 2250 is in a load path ($L_p$) of the touch sensitive device 2200, the electroactive substrate 2250 can deform by the same amount of load that the user experiences.

FIG. 22B illustrates how the angle of touch down ($\theta_1$) is adjusted when the electroactive substrate 2250 bends or flexes in conjunction with contact with a surface of another object. Accordingly, the load path ($L_p$) between the hand grip point ($H_p$) and the touch down point ($T_p$) is also adjusted.

Figure 23A:
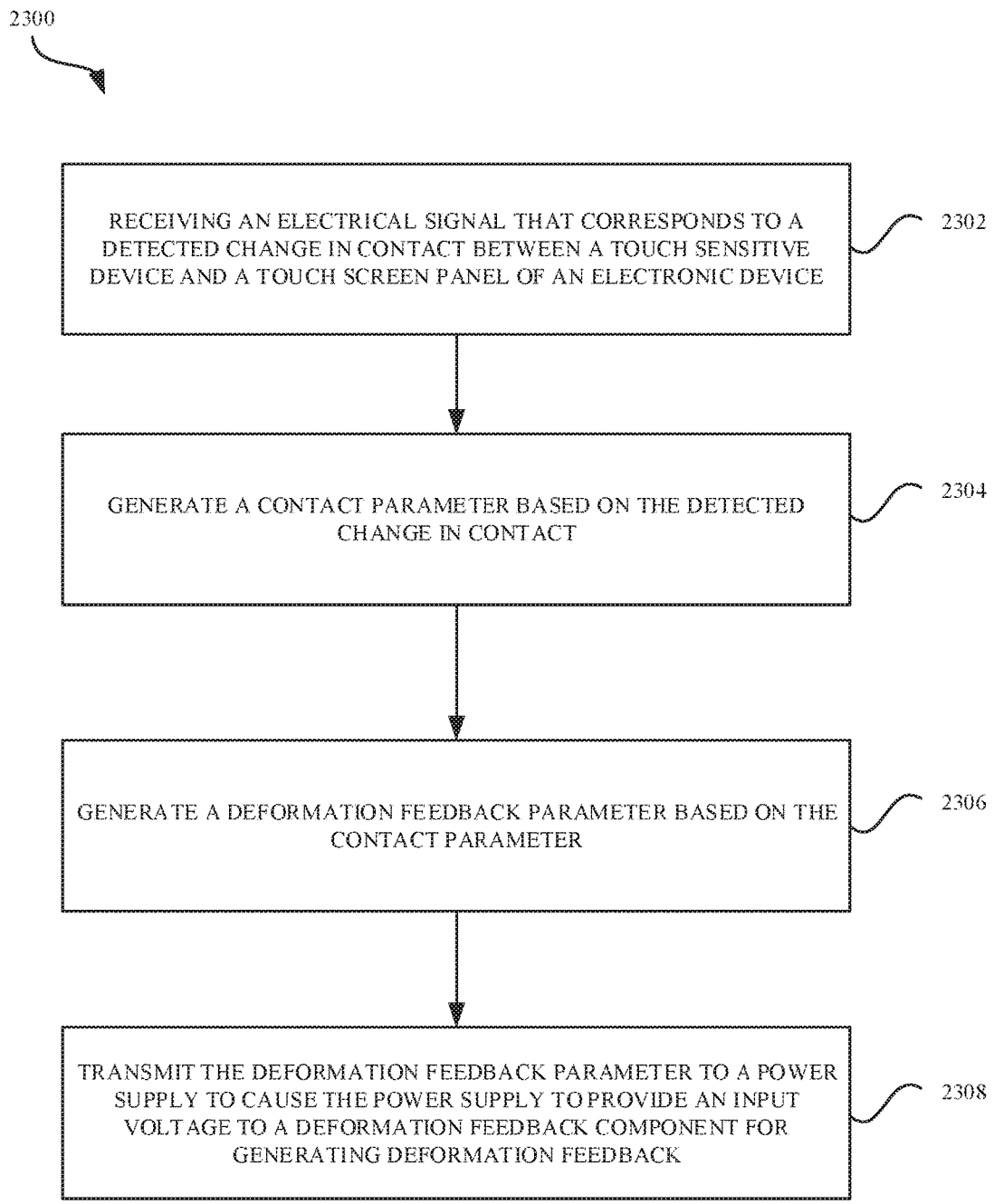
FIG. 23A illustrates a method for generating deformation feedback by a touch sensitive device, in accordance with some embodiments.

FIG. 23A illustrates a method 2300 for generating deformation feedback by a touch sensitive device 140, in accordance with some embodiments. As shown in FIG. 23A, the method begins at step 2302, where in conjunction with the distal tip of the 112 either coming into contact, changing the type of contact, or separating from contact with the touch screen panel 172 of the electronic device 170, the controller 210 of the touch sensitive device 140 can be configured to receive an electrical signal that indicates a change in capacitance, voltage resistance, or a combination thereof as detected by a sensor 260 or the deformation feedback component. In some embodiments, the contact can refer to an amount of force or mechanical strain that is applied against the deformation feedback component 250. In some embodiments, the contact can include a combination of thereof.

At step 2304, at least one contact parameter can be generated by the controller 210 from the change in contact (e.g., capacitance, voltage, resistance, impedance, and the like). The contact parameter can refer to at least one of distance ($D_1$) traveled by the tip 112, acceleration ($A_1$) of the tip 112, velocity ($V_1$) of the tip 112, force ($F_1$) applied by the tip 112 against the touch screen panel 172, and an angle ($\theta_1$) between the tip 112 and the touch screen panel 172.

At step 2306, the controller 210 can be configured to generate at least one deformation feedback parameter based on the contact parameter. The deformation feedback parameters can refer to an electrical signal that indicates an amount of voltage, amplitude, pulse width, duty cycle, and the like.

At step 2308, the controller 210 can be configured to transmit the at least one deformation feedback parameter to a power supply 230 to cause the power supply 230 to provide an input voltage to the deformation feedback component 250 via one or more electrodes 270 so as to cause the deformation feedback component 250 to deform from an initial configuration to a modified configuration so as to generate deformation feedback.

Figure 23B:
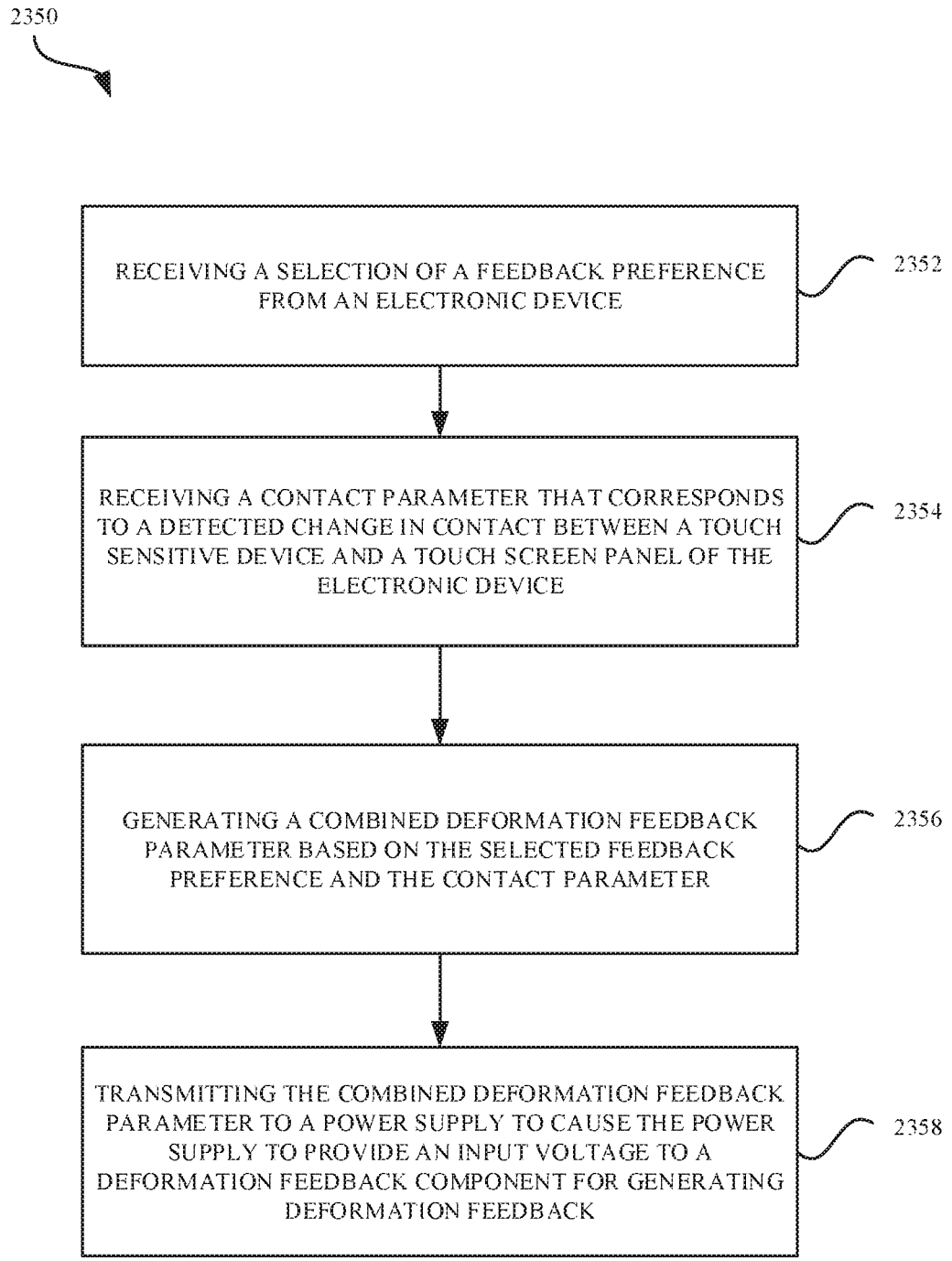
FIG. 23B illustrates a method for generating deformation feedback by a touch sensitive device, in accordance with some embodiments.

FIG. 23B illustrates a method 2350 for generating deformation feedback by a touch sensitive device 140, in accordance with some embodiments. The method 2350 can begin at step 2352 where the controller 210 of the touch sensitive device 200 receives a feedback preference from the electronic device 1950. The feedback preference can be received by the media application 1920 as executed by the electronic device 1950. At step 2354, the controller 210 can be configured to receive a contact parameter that corresponds to a detected change in contact between the touch sensitive device 200 and a touch screen panel 172. The contact parameter can correspond to a change in capacitance, voltage resistance, or a combination thereof in conjunction with contact between the touch sensitive device 200 and the touch screen panel 172.

At step 2356, the controller 210 of the touch sensitive device 200 can combine the respective electrical signals associated with the selected feedback preference and the contact parameter to form a combined deformation feedback parameter. The combined deformation feedback parameter can be transmitted to a power supply 230. The combined deformation feedback parameter can refer to an electrical signal that indicates an amount of voltage, amplitude, pulse width, duty cycle, and the like that is provided to the electrodes 270.

At step 2358, the controller 210 can be configured to transmit the combined deformation feedback parameter to a power supply 230 to cause the power supply 230 to generate an input voltage that is transmitted to the deformation feedback component 250 via one or more electrodes 270 so as to cause the deformation feedback component 250 to deform from an initial configuration to a modified configuration so as to generate deformation feedback.

Figure 24:
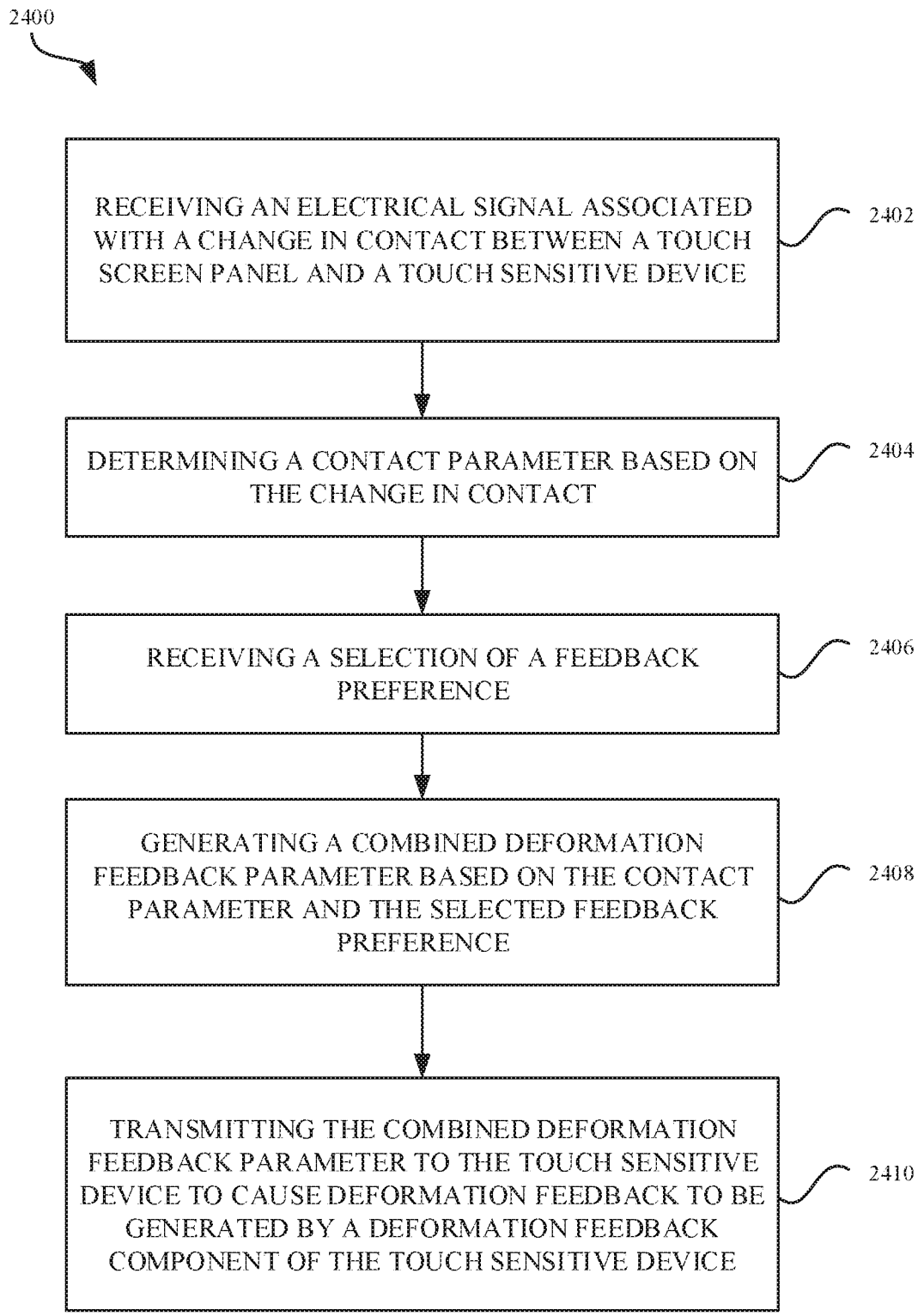
FIG. 24 illustrates a method for generating deformation feedback by a touch sensitive device, in accordance with some embodiments.

FIG. 24 illustrates a method 2400 for generating a combined deformation feedback parameter by the electronic device 1950, in accordance with some embodiments. As shown in FIG. 24, the method begins at step 2402, where in conjunction with the tip 112 of the touch sensitive device 140 coming into contact, changing the type of contact, separating from contact with the touch screen panel 172 of the electronic device 170, a capacitive sensor of the touch screen panel 172 detects a change in capacitance (e.g., change in voltage). At step 2404, the processor can determine a contact parameter based upon the detected change in capacitance. The contact parameter can refer to at least one of a distance ($D_1$) traveled by the tip 112, acceleration ($A_1$) of the tip 112, velocity ($V_1$) of the tip 112, force ($F_1$) applied by the tip 112 against the touch screen panel 172, and an angle ($\theta_1$) between the tip 112 and the touch screen panel 172.

At step 2406, the processor of the electronic device 1950 receives a selection of a feedback preference from the application 1920. Subsequently, at step 2408, the processor can generate a combined deformation feedback parameter that combines an electrical signal associated with the selection of the feedback preference and an electrical signal associated with the contact parameter. Thereafter, at step 2410, the processor can transmit the combined deformation feedback parameter to the touch sensitive device 140 to cause the deformation feedback component 150 to generate deformation feedback.

Figure 25:
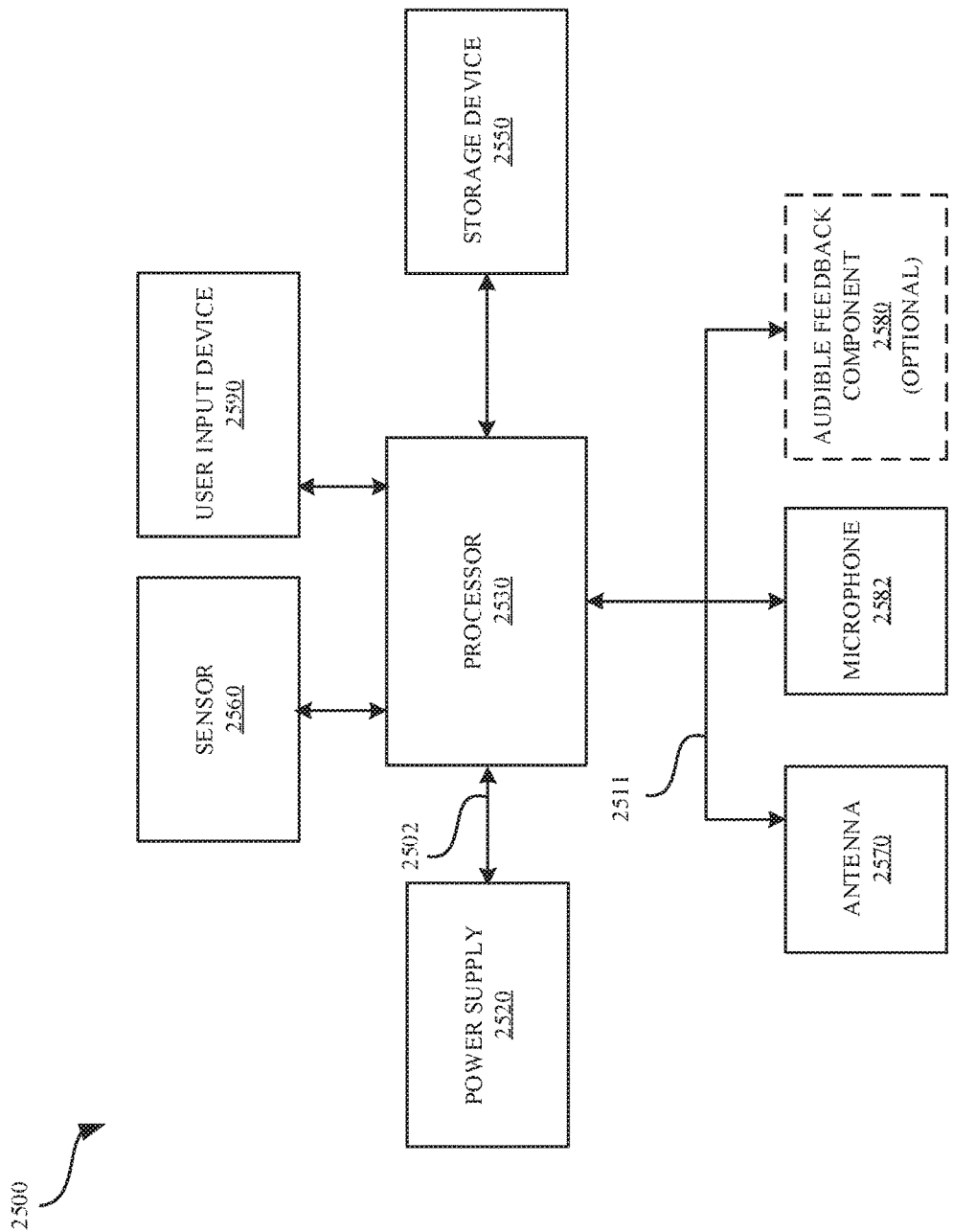
FIG. 25 illustrates a block diagram of an electronic device that can be used to interact with a touch sensitive device to implement the various components described herein, in accordance with some embodiments.

FIG. 25 illustrates a block diagram of an electronic device 2500 that can be used to implement the various components described herein, according to some embodiments. In particular, the detailed view illustrates various components that can be included in the electronic device 1950 illustrated in FIG. 19. As shown in FIG. 25, the electronic device 2500 can include a processor 2530 for controlling the overall operation of the electronic device 2500. The processor 2530 can refer to one or more of a general processor unit (GPU), central processing unit (CPU), or dedicated microcontroller. In some embodiments, the electronic device 2500 includes a power supply 2520. The electronic device 2500 can also include a user input device 2590 that allows a user of the electronic device 2500 to interact with the electronic device 2500. For example, the user input device 2590 can take a variety of forms, such as a touch screen panel 172, keyboard, buttons, keys, microphone 2582, or gesture input. The user input device 2590 can include a sensor 2560 (e.g., capacitance sensor). Still further the user input device 2590 can include a touch screen panel 172 that can be controlled by the processor 2530 to display information to the user. A data bus 2502 can facilitate data transfer between at least a storage device 2550 and the processor 2530. The electronic device 2500 can also include a network/bus interface 2511 that couples a wireless antenna 2570 to the processor 2530.

In some embodiments, the electronic device 2500 can optionally include an audible feedback component 2580 that is configured to generate a sound effect based on an audible feedback parameter. In some examples, the audible feedback parameter can be generated by the processor 2530 of the electronic device 2500 in conjunction with the contact made with the touch sensitive device 140.

The electronic device 2500 also includes a storage device 2550, which can comprise a single disk or multiple disks (e.g., hard drives), and includes a storage management module that manages one or more partitions within the storage device 2550. In some embodiments, the storage device 2550 can include flash memory, semiconductor (solid state) memory or the like. The storage device 2550 can also include a Random Access Memory (RAM) and a Read-Only Memory (ROM). The ROM can store programs, utilities or processes to be executed in a non-volatile manner. The RAM can provide volatile data storage, and stores instructions related to the operation of the electronic device 2500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic pencil, comprising:
a housing having walls capable of carrying operational components, the operational components including:
a distal tip extending from an opening defined by the walls of the housing;
a processor capable of providing operational instructions;
a sensor coupled to the processor, wherein the sensor is capable of detecting a stimulus originating from a source external to the housing that is applied to the walls, and responding by (i) determining properties of the stimulus, and (ii) communicating the properties of the stimulus to the processor; and
a feedback component that creates a physical deformation of a region of the walls of the housing according to the properties of the stimulus in response to an instruction received from the processor.

2. The electronic pencil of claim 1, wherein the feedback component is comprised of an electro-active substrate, a piezoelectric element, a shape-memory alloy, a coiled-spring, a rheological fluid, or an elastic compound.

3. The electronic pencil of claim 1, wherein the stimulus comprises a force applied to the walls, wherein a magnitude and an angle of the force is detectable by the sensor, and the physical deformation of the region of the walls is proportional to the magnitude and the angle of the force.

4. The electronic pencil of claim 3, wherein the sensor is capable of detecting a direction of the force, and the physical deformation of the region of the walls is altered in accordance with the direction of the force.

5. The electronic pencil of claim 4, where the physical deformation of the region is capable of being altered in an asymmetrical manner in accordance with the direction of the force.

6. The electronic pencil of claim 1, wherein the processor is capable of receiving a feedback preference, and the processor instructs the feedback component to physical deform the region of the walls according to the feedback preference.

7. The electronic pencil of claim 6, wherein the processor is capable of balancing a first amount of the properties of the stimulus with a second amount of the feedback preference.

8. The electronic pencil of claim 1, wherein the feedback component and the walls of the housing share at least one of a similar color, texture, or reflective finish.

9. A method for generating feedback at an accessory device that includes a housing, a sensor carried by walls of the housing, a distal tip extending from an opening defined by the walls of the housing, a feedback component capable of providing a feedback force, and a processor in communication with the sensor and the feedback component, the method comprising:
in response to detecting, by the sensor, a stimulus applied to the walls of the housing from a source that originates from outside the housing:
receiving, by the processor, a detection signal that is generated by the sensor and based on the stimulus, and
instructing, by the processor, the feedback component to provide an amount of the feedback force such as to deform a region of the walls of the housing in accordance with the stimulus.

10. The method of claim 9, wherein the feedback component is comprised of an electro-active substrate, a piezoelectric element, a shape-memory alloy, a coiled-spring, a rheological fluid, or an elastic compound.

11. The method of claim 9, wherein the stimulus includes a load applied to the walls of the housing, and wherein a magnitude and orientation of the load are detectable by the sensor, and the amount of feedback force corresponds to the magnitude and orientation of the load.

12. The method of claim 11, further comprising:
receiving, by the processor, a direction of the stimulus that is determined by the sensor; and
instructing, by the processor, the feedback component to provide the amount of feedback force such that the deformation of the region of the walls is altered in accordance with the direction of the stimulus force.

13. The method of claim 12, wherein the region of the walls is deformed in an asymmetrical manner in accordance with the direction of the stimulus force.

14. The method of claim 9, further comprising:
receiving, by the processor, a feedback preference; and
instructing, by the processor, the feedback component to alter the amount of feedback force according to the feedback preference.

15. The method of claim 14, further comprising:
balancing, by the processor, a first amount of properties of the stimulus with a second amount of the feedback preference.

16. An electronic accessory device for use with a touch sensitive portion of an electronic device, the electronic accessory device comprising:
a housing capable of carrying operational components, the operational components including:
a distal tip extending from an opening defined by walls of the housing;
a processor capable of providing operation instructions;
a sensor coupled to the processor, wherein the sensor is capable of detecting a region of the housing that is exposed to a stimulus originating from a source external to the housing, and responding by (i) determining properties of the stimulus, and (ii) transmitting the properties of the stimulus to the processor; and
a feedback component that is responsive to an instruction received from the processor, wherein the instruction causes the feedback component to selectively deform the region of the housing, and an amount of the deformation is based on the properties of the stimulus.

17. The electronic accessory device of claim 16, wherein the feedback component includes an electroactive substrate that is capable of selectively deforming the region of the housing, and the electroactive substrate is capable of expanding and contracting against the region of the housing.

18. The electronic accessory device of claim 17, further comprising:
an electrode that is in electrical communication with the electroactive substrate, wherein the electrode is capable of altering a shape of the electroactive substrate.

19. The electronic accessory device of claim 16, wherein the feedback component is carried by the walls of the housing.

20. The electronic accessory device of claim 16, wherein the region of the housing is exposed to mechanical strain that is applied by the source external to the housing, and the amount of the deformation is based upon an amount of the mechanical strain.

* * * * *